(12) United States Patent
Lafford et al.

(10) Patent No.: US 12,475,108 B1
(45) Date of Patent: Nov. 18, 2025

(54) FULFILMENT OF TRANSACTION REQUESTS

(71) Applicant: Arm Limited, Cambridge (GB)

(72) Inventors: Devin S Lafford, Austin, TX (US); Rania Hussein Hassan Mameesh, Cambridge (GB); Klas Magnus Bruce, Leander, TX (US); Andrew John Turner, Cambridge (GB); Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/887,472

(22) Filed: Sep. 17, 2024

(51) Int. Cl.
  *G06F 16/00* (2019.01)
  *G06F 16/23* (2019.01)

(52) U.S. Cl.
  CPC .................. *G06F 16/2379* (2019.01)

(58) Field of Classification Search
  None
  See application file for complete search history.

(56) References Cited

U.S. PATENT DOCUMENTS

| | | | |
|---|---|---|---|
| 2014/0164711 A1* | 6/2014 | Loh ............... | G06F 12/0862 711/136 |
| 2020/0159703 A1* | 5/2020 | Pascali ........... | G06F 16/24539 |
| 2021/0208792 A1* | 7/2021 | Peterson ......... | G06F 3/0685 |

\* cited by examiner

*Primary Examiner* — Anhtai V Tran
(74) *Attorney, Agent, or Firm* — NIXON & VANDERHYE P.C.

(57) ABSTRACT

There is provided an apparatus, a method, a system, a chip containing product, and a medium. The apparatus comprises a first storage structure to store a first set of data items, the first storage structure comprising a first transaction queue to store first transaction data to track fulfilment of outstanding first transaction requests. The apparatus is also provided with a second storage structure. The first storage structure is responsive to a received request for a given data item, to issue a first transaction request for the given data item to the second storage structure, and for a stage of fulfilment of the first transaction request, to omit storage of information relating to the first transaction request in the first transaction queue and to delegate the maintenance of at least some information relating to the stage of fulfilment of the first transaction request to the second storage structure.

20 Claims, 22 Drawing Sheets

FULFILMENT OF TRANSACTION REQUESTS

TECHNICAL FIELD

The present invention relates to data processing. More particularly the present invention relates to an apparatus, a system, a chip containing product, a method, and a non-transitory computer-readable medium.

BACKGROUND

Some processing apparatuses are provided with a storage hierarchy comprising a first storage structure and a second storage structure. The first storage structure and the second storage structure may be provided with respective transaction queues to store transaction data to track fulfilment of outstanding transaction requests.

SUMMARY

According to a first aspect of the present techniques there is provided an apparatus comprising:
 a first storage structure configured to store a first set of data items, the first storage structure comprising a first transaction queue to store first transaction data to track fulfilment of outstanding first transaction requests for data items to be retrieved into the first storage structure; and
 a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items,
 wherein the first storage structure is responsive to a received request of a given request type for a given data item, to perform a lookup of the given data item in the first set of data items and, when the lookup misses in the first set of data items:
  to issue a first transaction request for the given data item to the second storage structure; and
  for at least one stage of fulfilment of the first transaction request, to omit storage of information relating to the first transaction request in the first transaction queue and to delegate the maintenance of at least some information relating to the at least one stage of fulfilment of the first transaction request to the second storage structure.

According to a second aspect of the present techniques there is provided a system comprising:
 the apparatus according to the first aspect, implemented in at least one packaged chip;
 at least one system component; and
 a board,
 wherein the at least one packaged chip and the at least one system component are assembled on the board.

According to a third aspect of the present techniques there is provided a chip-containing product comprising the system according to the second aspect, wherein the system is assembled on a further board with at least one other product component.

According to a fourth aspect of the present techniques there is provided a method of operating an apparatus comprising a first storage structure configured to store a first set of data items, the first storage structure comprising a first transaction queue to store first transaction data to track fulfilment of outstanding first transaction requests for data items to be retrieved into the first storage structure, and a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items, the method comprising:
 in response to receipt, by the first storage structure, of a received request of a given request type for a given data item, performing a lookup of the given data item in the first set of data items and, when the lookup misses in the first set of data items:
  issuing a first transaction request for the given data item to the second storage structure; and
  for at least one stage of fulfilment of the first transaction request, omitting storage of information relating to the first transaction request in the first transaction queue and delegating the maintenance of at least some information relating to the at least one stage of fulfilment of the subsequent transaction request to the second storage structure.

According to a fifth aspect of the present techniques there is provided a non-transitory computer-readable medium storing computer-readable code for fabrication of an apparatus comprising:
 a first storage structure configured to store a first set of data items, the first storage structure comprising a first transaction queue to store first transaction data to track fulfilment of outstanding first transaction requests for data items to be retrieved into the first storage structure; and
 a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items,
 wherein the first storage structure is responsive to a received request of a given request type for a given data item, to perform a lookup of the given data item in the first set of data items and, when the lookup misses in the first set of data items:
  to issue a first transaction request for the given data item to the second storage structure; and
  for at least one stage of fulfilment of the first transaction request, to omit storage of information relating to the first transaction request in the first transaction queue and to delegate the maintenance of at least some information relating to the at least one stage of fulfilment of the subsequent transaction request to the second storage structure.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
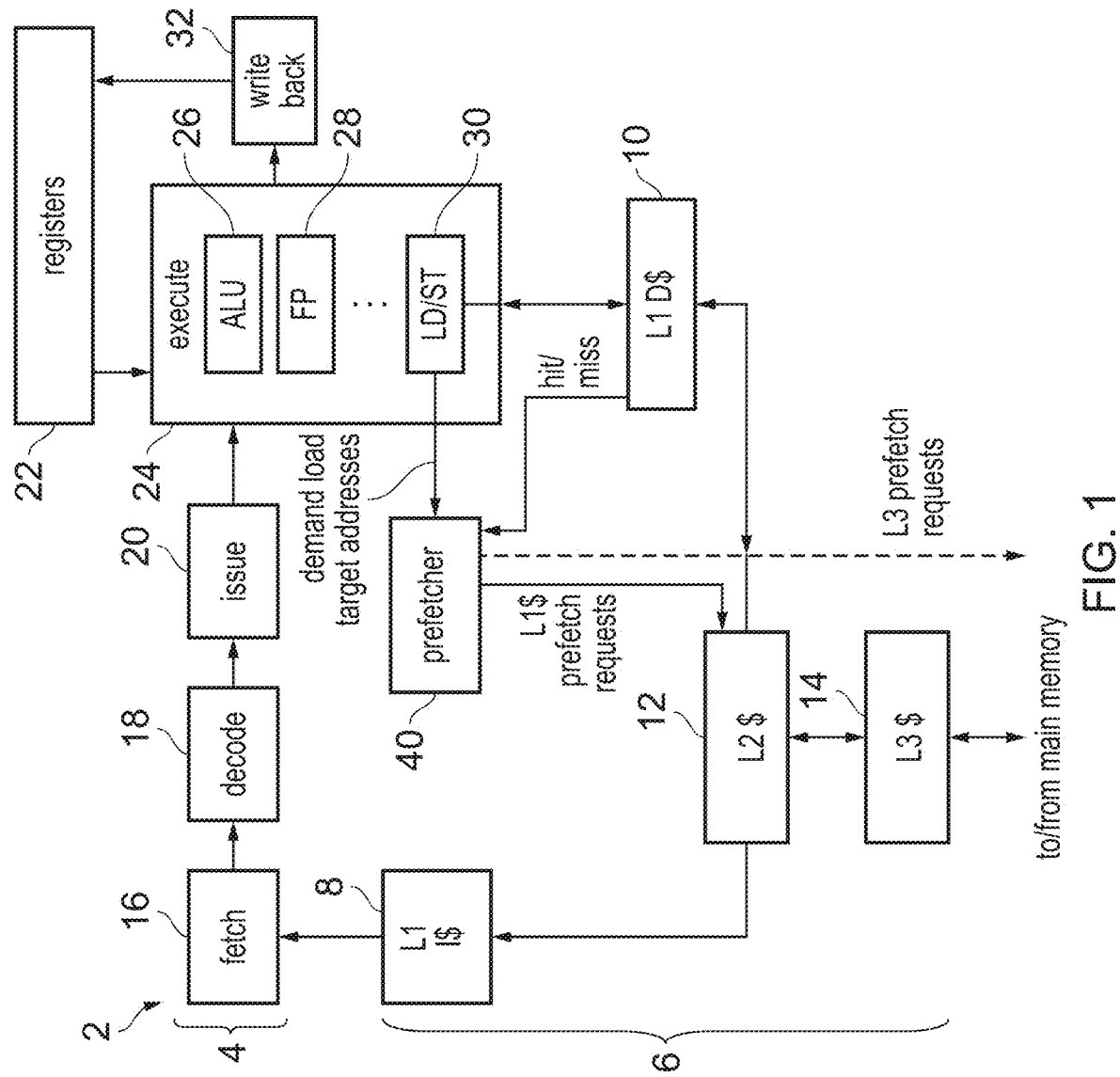
FIG. 1 schematically illustrates an apparatus according to some configurations of the present techniques.

Before discussing the configurations with reference to the accompanying figures, the following description of configurations is provided.

In accordance with one example configuration there is provided an apparatus. The apparatus is provided with a first storage structure configured to store a first set of data items. The first storage structure comprises a first transaction queue to store first transaction data to track fulfilment of outstanding first transaction requests for data items to be retrieved into the first storage structure. The apparatus is also provided with a second storage structure configured to store a second set of data items. The second storage structure comprising a second transaction queue to store second transaction data to track fulfilment of outstanding second transaction requests for data items to be retrieved into the second storage structure. The first storage structure and the second storage structure are arranged in a storage hierarchy configured such that the first set of data items can be accessed by processing circuitry in fewer cycles than the second set of data items. The first storage structure is responsive to a received request of a given request type for a given data item, to perform a lookup of the given data item in the first set of data items and, when the lookup misses in the first set of data items: to issue a first transaction request for the given data item to the second storage structure, and for at least one stage of fulfilment of the first transaction request, to omit storage of information relating to the first transaction request in the first transaction queue and to delegate the maintenance of at least some information relating to the at least one stage of fulfilment of the first transaction request to the second storage structure.

The storage hierarchy is provided to store data items that may be required by the processing circuitry during processing operations. The storage hierarchy comprises the first storage structure and the second storage structure, and may additionally comprise one or more further storage structures. The first storage structure is arranged to be accessed more rapidly (i.e., in fewer clock cycles) than the second storage structure. This may be achieved, for example, by providing the first structure physically located closer to the processing circuitry than the second storage structure. Each of the first storage structure and the second storage structure are provided with a respective transaction queue. When a request for a given data item is received, for example, from the processing circuitry, from another storage structure, or from one or more additional structures provided to the processing circuitry to support processing, the storage structure that receives the request performs a lookup to determine if the given data item that is requested in the transaction request is present in that storage structure. If so, then the given data item may be returned to the structure from which the transaction request was received. Alternatively, if the given data item is not present in the storage structure, the storage structure then issues a transaction request to retrieve the given data item from a further storage structure in the storage hierarchy and stores information to track the transaction request in the transaction queue. The inventors have recognised that, in some use cases, the first transaction queue that is provided in the first storage circuitry may have to track a large number of outstanding transaction requests and could become saturated. This may prevent more urgent transaction requests from being fulfilled in a timely manner and could result in a reduction in throughput for the processing circuitry. The first storage structure is therefore responsive to a given request type for the given data item, when it is determined that the given data item is not present in the first storage structure, to issue a first transaction request to the second storage structure and for at least one stage of fulfilment of the outstanding request, to delegate tracking of the first transaction request to the second storage structure. For the stage of fulfilment in which the tracking of the transaction request is delegated, the first storage structure omits storage of information to track the first transaction request in the first transaction queue. As a result, the number of outstanding transaction requests that are stored in the first transaction queue can be reduced with the responsibility for fulfilling the requests being handled by the second storage structure. This reduces the likelihood that the first transaction queue will become full (saturated) and increases the total number of outstanding transaction requests that can be in flight at a given time. The stages of fulfilment for which the first storage structure is able to delegate fulfilment may be any one or more stages of fulfilment of the transaction request and will be described below.

As discussed, the storage hierarchy may comprise further storage structures in addition to the first storage structure and the second storage structure and the storage structures within the hierarchy may be arranged in any manner. In some configurations the first storage structure and the second storage structure are one of: consecutive levels of storage within the storage hierarchy; and non-consecutive levels of storage within the storage hierarchy. Where the first storage structure and the second storage structure are consecutive levels of storage structure, there may be provided further storage structures either closer to the processing circuitry (i.e., the further storage structures are accessible in fewer clock cycles than the first storage structure and the second storage structure), or further from the processing circuitry (i.e., the further storage structures require a greater number of clock cycles to access). Where the first storage structure and the second storage structure are non-consecutive levels of storage structure, one or more levels of further storage structure may be present in between the first storage structure and the second storage structure (i.e., the one or more levels of further storage structure are each accessible in fewer clock cycles than the second storage structure, but require a greater number of clock cycles to be accessed than the first storage structure). The one or more levels of further storage structure provided between the first storage structure and the second storage structure may be the only additional levels of storage structure provided in addition to the first storage structure and the second storage structure. Alternatively, one or more levels of further storage structure may be provided between the first storage structure and the second storage structure and one or more additional levels of further storage structure may be provided closer to the processing circuitry or further from the processing circuitry.

In some configurations the received request is a first request; and the first storage structure is responsive to a subsequent request for the given data item, the subsequent request received before fulfilment of the first request, to perform one or more actions to merge the first request and the subsequent request. The merging of the first request and the subsequent request may be performed at a variety of stages of fulfilment and may depend on when the subsequent request is received relative to the fulfilment of the first request. The one or more actions may comprise merging the first request and the subsequent request or triggering a further storage structure, e.g., the second storage structure to perform actions to merge the first request and the subsequent request. The merging of the first request and the subsequent request may be performed immediately or may be deferred until a subsequent stage of fulfilment of the first request, for example, depending on what stage of fulfilment the first request has reached and whether the first storage circuitry is aware of the first request (e.g., because information relating to the first request is stored in the first transaction queue for a current stage of fulfilment of the first request), or whether the first storage circuitry is unaware of the first request (e.g., because the first storage structure has delegated fulfilment of the first transaction request and, for the current stage of fulfilment of the first request, the storage of information relating to the first transaction request is not present in the first transaction queue).

The given request type and a type of the further request may be a same request type. However, in some configurations the given request type is a prefetch request and the first storage structure is responsive to receipt of a further request being of a demand type to retain the demand request in the first transaction queue during all stages of fulfilment of the demand request. A prefetch request is a request issued by prefetch circuitry for a data item to be retrieved into a storage structure in anticipation that the data item will be required by the processing circuitry at a future point. A demand request for a data item is a request from processing circuitry indicating that the data item is now required for processing. In general, if a prefetch request for a data item is not fulfilled, then processing may continue. If a subsequent demand request is issued for the data item and the prefetch request has not been fulfilled, then this will result in an increase in latency whilst the processing circuitry waits for the data item to be retrieved. On the other hand, if a demand request is not fulfilled, then processing will stall and the processing circuitry may be forced to take action to recover from that stall, for example, an exception may be taken. In general, the tracking of fulfilment of a demand request may be of greater importance than the tracking of a prefetch request. In the presently described configuration, when the subsequent request is a demand request, that demand request is retained in the first transaction queue during all stages of fulfilment. In other words, the first storage structure ensures that the demand request is fulfilled. The demand request may also be tracked via the second storage circuitry in the second transaction queue. The first storage structure may track the demand request in the first transaction queue independently of whether the first transaction request is currently tracked using the first transaction queue.

In some configurations the first storage structure is responsive to the subsequent request being of the demand request type, to defer issuing a demand transaction for the given data item to the second storage structure until a signal acknowledging the first transaction request has been received from the second storage structure. The first storage structure may, in some configurations, initially record the first transaction request in the first transaction queue. The first transaction request may remain in the first transaction queue, for example, until the signal acknowledging the first transaction request is received from the second storage structure. If the demand request is received shortly after the first request is received, e.g., after the first storage structure has issued the first transaction request and before the first storage structure has received the signal acknowledging the first transaction request, then the first storage structure may retain the demand request in the first transaction queue without issuing a demand transaction for the data. The demand request may be retained without issuing the demand transaction until the signal acknowledging the first transaction is received from the second storage structure. At this point, the first storage structure may issue a demand transaction to the second storage structure for the given data item and may invalidate the entry in the first transaction queue tracking the first transaction request (responsibility for the first transaction request is, at this point, delegated to the second storage circuitry). However, and as discussed above, the first storage structure retains the demand request in the first transaction queue to ensure that the demand request is fulfilled.

In some configurations the first storage structure is responsive to a data available signal, indicating that the second set of data items comprises the given data item requested by the first request, to take one or more steps to fulfil one of the first request and the subsequent request and to omit one or more steps required to fulfil the other of the first request and the subsequent request. The given data item may be comprised in the second set of data items either because the given data item was already present in the second storage structure or because the second storage structure has retrieved the given data item (e.g., from a further level of storage structure in the storage hierarchy or from a main memory) and stored it in the second set of data items. Dependent on the stages of fulfilment of the first transaction request that are being tracked by the first storage structure, the first storage structure may be aware of both the first transaction request and a subsequent transaction request and, in response to the data available signal, may choose to take action to fulfil only one of the subsequent transaction request and the first transaction request. In some configurations, where the subsequent transaction request is a demand request, the first storage structure is configured to fulfil the demand transaction request and to omit taking any steps to fulfil the first transaction request. On the other hand, where both the first transaction request and the subsequent transaction request are prefetch requests, the first storage circuitry may be configured to fulfil the first transaction request and to omit taking any steps to fulfil the second transaction request.

In some configurations the first storage structure is configured, when the subsequent request is received subsequent to the data available signal and as the one or more actions, to combine the first request and the subsequent request in the first transaction queue. In other words, if the first storage circuitry has already been informed, via receipt of the data available signal, that the given data item is present in the second set of data items in the second storage circuitry, then the first storage circuitry may already have taken action to retrieve the given data item. In such a situation, issuing a subsequent transaction request in response to receipt of the subsequent request would unnecessarily use both bandwidth and space in the first transaction queue. Hence, the subsequent transaction request and the first transaction request are merged in the first transaction queue. Merging the first transaction request and the subsequent transaction request may comprise tagging the information indicative of the first transaction request stored in the first transaction queue to indicate the subsequent request or overwriting one or more items of data stored in the information indicative of the first transaction request.

In some configurations the first storage structure is configured, when the subsequent request is received prior to the data available signal, to issue a subsequent transaction request to the second storage structure for the given data item to trigger, as the one or more actions, the first transaction request and the subsequent transaction request to be combined in the second storage structure; and for at least one stage of fulfilment of the subsequent transaction request, to omit storage of at least some information relating to the subsequent transaction request in the first transaction queue and to delegate the maintenance of at least some information relating to the at least one stage of fulfilment of the subsequent transaction request to the second storage structure. In other words, if the subsequent request is received by the first storage circuitry before the first storage circuitry has been informed that the data is available in the second storage circuitry, the first storage circuitry may, in some configurations, issue a subsequent transaction request to the second storage circuitry. The subsequent request may be a demand request or it may be a prefetch request. In some configurations, the subsequent transaction request may be issued and the first storage circuitry may omit storing information relating to the subsequent transaction request for at least one stage of fulfilment of the subsequent transaction request. The first storage structure may, dependent on the relative timing of the first request and the subsequent request and the stages of fulfilment tracked by the first storage circuitry, either be aware or unaware that two requests have been issued for the given data item. Regardless as to whether the first storage circuitry is aware of the first request, the subsequent request may comprise sufficient data to trigger the second storage structure to recognise that the subsequent transaction request and the earlier received first transaction request are both for the given data item and, hence, the second storage structure may be triggered to merge the first transaction request and the subsequent transaction request.

In some configurations the second storage structure is responsive to receipt of the first transaction request to allocate the first transaction request into the second transaction queue. The second storage structure is therefore configured to take responsibility of fulfilment of the first transaction request. The second storage structure may be configured to treat the first transaction request in an identical manner to any other received transaction request. In other words, the second storage structure may be unaware that the responsibility for fulfilment of the first transaction request has been delegated to it. Alternatively, the second storage structure may mark the received first transaction request to indicate that the first storage structure, from which the first transaction request was received, has delegated the responsibility for fulfilment of the first transaction request.

In some configurations the second storage structure is responsive to receipt of the given data item to trigger a transfer of the given data item to the first storage structure. Triggering the transfer may comprise triggering the first storage structure to pull the given data item into the first set of data items. Alternatively, triggering the transfer may comprise pushing the given data item into the first set of data items.

In some configurations triggering the transfer comprises issuing a data available signal indicating receipt of the given data item to the first storage structure; and the first storage structure is responsive to the data available signal, to trigger allocation of the first transaction request into the first transaction queue and to take one or more actions to transfer the given data item to the first storage structure. Once the first storage structure has received the data available signal indicating that the given data item is available, i.e., the given data item is comprised in the second set of data items, the first storage structure may take back responsibility for fulfilment of the first request. In particular, the first storage structure is responsive to the data available signal to trigger allocation of the first transaction request into the first transaction queue. The first storage structure then takes one or more actions to retrieve the data from the second storage structure. For example, the first storage structure may reissue the first transaction whilst retaining the information in the first transaction queue in the knowledge that the given data item is available in the second set of data items and the second storage structure will be able to respond by returning the given data item.

As discussed above, the stages of fulfilment that are omitted from allocation in the first transaction queue may be variously defined. For example, in some configurations the first storage structure is configured, when the lookup misses in the first set of data items to defer allocation of the first transaction request for the given data item into the first transaction queue until receipt of an indication, from the second storage structure, that the given data item is available. In other words, the first storage structure issues the first transaction request to the second storage structure, but takes no further action to track the first transaction request until it receives the data available indication. The first storage circuitry therefore passes on the request taking no action on its own part to track fulfilment of that request. This approach minimises the need to store information in the first transaction queue with responsibility for all stages of the transaction up to the point of receipt of the data available signal being delegated to the second transaction queue.

Alternatively, or in addition, e.g., in response to a different type of received request or a different utilisation of the first transaction queue, in some configurations the first storage structure is configured, when the lookup misses in the first set of data items: to perform an initial allocation of the first transaction request for the given data item into the first transaction queue; and in response to an acknowledgement signal from the second storage structure, to deallocate the first transaction request from the first transaction queue. In such configurations the first storage circuitry takes some initial responsibility for the first transaction. In particular, the first storage circuitry tracks the first transaction request at least until the second storage circuitry has acknowledged receipt of the first transaction request. Once the second storage circuitry has acknowledged receipt of the first transaction request, the first storage circuitry deallocates the first transaction request from the first transaction queue, e.g., the first transaction request may be deleted from the first transaction queue or invalidated. Responsibility for the first transaction request is, at this point, delegated to the second transaction queue. In some configurations the first storage circuitry may be configured to select between initially allocating the first transaction request in the first transaction queue and deferring allocation of the first transaction request for the given data item into the first transaction queue until receipt of an indication, from the second storage structure, that the given data item is available. The selection may be based on one or more of: system conditions, available bandwidth, available space in the first transaction queue, a type of the request, and/or a user preference stored, for example, in a configuration register.

In some configurations the first storage structure is responsive to receipt of a data present signal, prior to receipt of the acknowledgement signal, indicating that the given data item is comprised in the second set of data items, to take one or more actions to transfer the given data item to the first storage structure without deallocating the first transaction request. In other words, the responsibility for fulfilment of the first transaction request is only delegated when the given data item is not stored in the second set of data items. When the given data item is already present in the second set of data items, delegation of the responsibility for fulfilment of the first transaction request would only result in an increased overhead because the first transaction request would be deallocated from the first transaction queue and then reallocated due to the receipt of the data available signal. By retrieving the data item without deallocating the first transaction request from the first transaction queue, efficiency of the servicing of the first transaction request can be improved.

In some configurations the first storage structure is responsive to a determination that the given data item is no longer required to issue a transaction abort signal to the second storage structure. The determination that the given data item is no longer required may be received from the processing circuitry or from a higher level of storage structure (i.e., one that is accessible to the processing circuitry in fewer clock cycles than the first storage structure). Where the first storage structure is tracking the first transaction request in the first transaction queue, the first storage structure may cause the first transaction request to be deallocated from the first transaction queue.

In some configurations the second storage structure is responsive to the transaction abort signal, to deallocate the first transaction request from the second transaction queue. The second storage structure may issue one or more acknowledgement signals to the first storage structure and/or may signal the transaction abort to one or more downstream storage structures (i.e., storage structures that require a greater number of clock cycles in order to be accessed by the processing circuitry).

In some configurations the apparatus comprises auxiliary transaction storage circuitry comprising an auxiliary transaction queue to store auxiliary transaction data to track fulfilment of outstanding further transaction requests for data items to be retrieved to the first storage circuitry, wherein the first storage structure is responsive to a further received request of a further request type for a further data item, to perform a lookup of the further data item in the first set of data items and, when the lookup misses in the first set of data items: to issue a further transaction request for the further data item to the second storage structure; and for at least one stage of fulfilment of the further transaction request, to omit storage of information relating to the further transaction request in the first transaction queue and to trigger an allocation procedure to allocate an entry in the auxiliary transaction queue and to encode index information indicative of the entry in the further transaction request. The auxiliary transaction storage may be provided as a storage structure within the first storage circuitry or as a separate storage structure outside of the first storage circuitry. The auxiliary transaction storage circuitry is arranged as an alternative structure for tracking outstanding transaction requests that is separate from the first transaction queue and is provided in addition to the first transaction queue. The auxiliary transaction storage circuitry may store different information to the first transaction queue and/or may store only a subset of the information that is required to be stored in the first transaction queue. The provision of the auxiliary transaction storage circuitry therefore allows transaction request issued in response to further received requests of the further request type that would otherwise have been stored in the first transaction storage queue to be offloaded, thereby increasing the availability of the first transaction storage queue. In some configurations, the further transaction type is at least one of a demand request and a prefetch request. The delegation of storage of information relating to the further transaction request to the auxiliary transaction storage circuitry may comprise delegating any one or more stages of fulfilment of the further transaction request. In other words, tracking fulfilment of the further transaction request may be delegated to the auxiliary transaction storage in much the same way as delegation of responsibility for stages of fulfilment of the first transaction request may be delegated to the second storage structure. Where a transaction request is recorded in the auxiliary transaction circuitry, that transaction request is recorded at a particular index. The index identifying the entry for the further transaction request is encoded within the further transaction request that is passed to the second storage circuitry to identify that the further transaction request is tracked by the auxiliary storage structure.

Whilst the provision of the auxiliary transaction storage and its operation in response to the further received request has been described as an additional feature in the context of the apparatus of the first aspect, it will be readily apparent to the person of ordinary skill in the art that the features of the auxiliary transaction storage and the response to the further received request may be provided as a solution in absence of the features of the first aspect.

In other words, according to a sixth aspect of the present techniques there is provided an apparatus comprising:

a first storage structure configured to store a first set of data items, the first storage structure comprising a first transaction queue to store first transaction data to track fulfilment of outstanding first transaction requests for data items to be retrieved into the first storage structure;

a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items; and auxiliary transaction storage circuitry comprising an auxiliary transaction queue to store auxiliary transaction data to track fulfilment of outstanding further transaction requests for data items to be retrieved to the first storage circuitry, wherein the first storage structure is responsive to a further received request of a further request type for a further data item, to perform a lookup of the further data item in the first set of data items and, when the lookup misses in the first set of data items:

to issue a further transaction request for the further data item to the second storage structure; and for at least one stage of fulfilment of the further transaction request, to omit storage of information relating to the further transaction request in the first transaction queue and to trigger an allocation procedure to allocate an entry in the auxiliary transaction queue and to encode index information indicative of the entry in the further transaction request.

In some configurations the first storage circuitry is configured to store at least one data field in the first transaction data that is not present in the auxiliary transaction queue. In other words, the amount of data that is stored in the auxiliary transaction queue is less than the data that would be stored in the same transaction was recorded in the first transaction queue. The provision of the auxiliary transaction storage circuitry having an auxiliary transaction queue reduces the total amount of information that is required to be stored when tracking outstanding transaction requests. Hence, a reduced circuit area can be provided per entry in the transaction queue providing a more efficient use of circuit area and greater power efficiency.

In some configurations the first storage structure is responsive to receipt of a request complete indication comprising encoded index information, to trigger a lookup in the auxiliary transaction queue using the encoded index information to retrieve the entry indicative of the further received request, and to issue a read request for the further data item to be retrieved into the first storage structure based on the entry. The second storage structure is responsive to the further transaction request to determine whether the further data item is already present in the second storage structure and, if not, to trigger retrieval of the further data item into the second set of data items. The second storage structure may track the fulfilment of the retrieval of the further data item in the second transaction queue or with further auxiliary transaction storage circuitry associated with the second storage structure. The further auxiliary transaction storage circuitry and the auxiliary transaction storage circuitry may be the same auxiliary transaction storage circuitry. Regardless as to how the second storage circuitry tracks the retrieval of the further data item, once the second storage circuitry has determined that the further data item is present, either in the second set of data items or otherwise, e.g., the further data item is stored in a buffer awaiting allocation into the second set of data items, the second storage circuitry returns the index that was encoded into the further transaction request to the first storage circuitry. The first storage circuitry is responsive to receipt of the index to trigger a lookup in the auxiliary transaction storage circuitry to retrieve the necessary data relating to the further data item. The necessary data may comprise an address of a memory location of the data item. Once the necessary information for identifying the further data item has been retrieved, the first storage circuitry is configured to use this information to trigger a read request for the further data item to be retrieved into the first storage circuitry. The read request may, in some configurations, be a demand request or a prefetch request.

In some configurations the second storage structure is configured to return the request complete indication when the second set of data items comprises the further data item. The second storage structure may therefore not need to perform any actions to retrieve the further data item.

In some configurations the second storage structure is responsive to receipt of the further data item to return the request complete indication, and to omit allocation of the further data item into second set of data items. The second storage structure may therefore store the further data item in a data buffer prior to allocation. Rather than allocating the further data item, the second storage structure may omit allocation for a number of clock cycles to allow the first storage circuitry to issue a read request for the further data item. In other words, the second storage circuitry may defer allocating the further data item to allow the first storage structure to retrieve the further data item. If a request to read the further data item is not received from the first storage circuitry within a predefined number of clock cycles, the second storage structure may allocate the further data item into the second set of data items to be retrieved by the first storage structure at a later point.

Particular configurations will now be described with reference to the figures.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 60 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests discussed below. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example, a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analyzing patterns of demand target addresses specified by demand memory access requests issued by the load/store unit 30, and detecting stride sequences of addresses where there are a number of addresses separated at regular intervals of a constant stride value. The prefetcher 40 uses the detected stride address sequences to generate prefetch load requests which are issued to the memory system 6 to request that data is brought into a given level of cache. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled. The prefetcher 40 may be able to perform prefetching into a single cache or into multiple caches. For example, FIG. 1 shows an example of the prefetcher 40 issuing level 1 cache prefetch requests which are sent to the level 2 cache 12 or downstream memory and request that data from prefetch target addresses is brought into the level 1 data cache 10. Also the prefetcher 40 in this example can also issue level 3 prefetch requests to the main memory requesting that data from prefetch target addresses is loaded into the level 3 cache 14. The level 3 prefetch request may look a longer distance into the future than the level 1 prefetch requests to account for the greater latency expected in obtaining data from main memory into the level 3 cache 14 compared to obtaining data from a level 2 cache into the level 1 cache 10. In systems using both level 1 and level 3 prefetching, the level 3 prefetching can increase the likelihood that data requested by a level 1 prefetch request is already in the level 3 cache. However, it will be appreciated that the particular caches loaded based on the prefetch requests may vary depending on the particular circuit of implementation.

It will be readily apparent to the skilled person that a stride based prefetcher, such as the one described in relation to FIG. 1 is merely one example of a possible prefetcher. The prefetcher may, in some configurations, predict access patterns based on a producer-consumer relationship between two memory access instructions. The person of ordinary skill in the art would appreciate that the prefetch generation circuitry can be of any form and use any algorithm to generate the prefetch requests.

Figure 2:
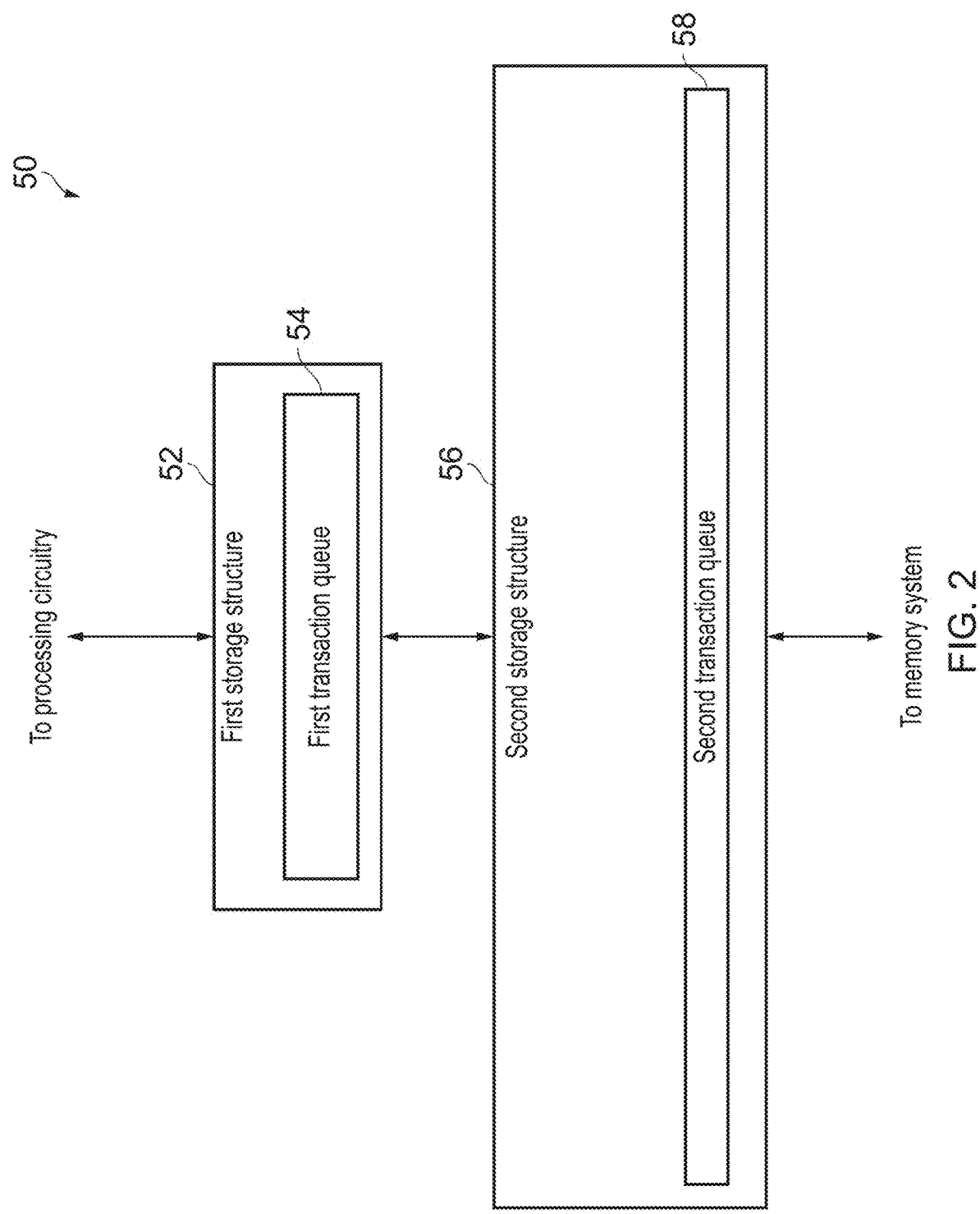
FIG. 2 schematically illustrates an apparatus according to some configurations of the present techniques.

FIG. 2 schematically illustrates an apparatus 50 according to some configurations of the present techniques. The apparatus 50 is provided with a first storage structure 52 and a second storage structure 56. The first storage structure 52 is configured to store a first set of data items and comprises a first transaction queue 54 to store information relating to outstanding transaction requests for data items to be retrieved into the first storage circuitry 52. The second storage structure 56 is configured to store a second set of data items and comprises a second transaction queue 58 to store information relating to outstanding transaction requests for data items to be retrieved into the second storage circuitry 56. The first storage structure 52 and the second storage circuitry 56 are part of a storage hierarchy with the first storage structure 52 provided closer to the processing circuitry than the second storage structure 56. The first storage structure 52 is arranged to be accessed by the processing circuitry in fewer clock cycles than the second storage structure 56.

The first storage structure 52 is responsive to receipt of a request of a given type for a given data item to perform a lookup in the first set of data items for the given data item. In the event that the first set of data items comprises the given data item, then the first storage structure 52 may, for some types of request (e.g., demand requests), return the given data item to the processing circuitry. Alternatively, for other types of request (e.g., a prefetch request to prefetch the given data item into the first storage structure), the first storage structure 52 may take no action. When the first storage structure 52 determines that the lookup misses in the first set of data items, the first storage structure 52 may issue a first transaction request to the second storage structure 56 to retrieve the given data item. The first transaction request may be issued to trigger the second storage structure 56 to determine if the given data item is stored in the second set of data items. If the second storage circuitry 56 determines that the given data item is comprised in the second set of data items, then the second storage circuitry 56 may either signal that the given data item is present or take one or more actions to trigger the given data item to be transferred to the first storage structure 52. If the second storage circuitry 56 determines that the given data item is not comprised in the second set of data items, then the second storage circuitry 56 may issue a second transaction request to the memory system to cause the given data item to be retrieved. The second storage structure 56 records information identifying the second transaction request in the second transaction queue 58.

The first storage structure 52 is responsive to a given request type, and when the given data item is not present in the first storage structure 52, instead of recording information identifying the first transaction request in the first transaction queue 54 for all stages of fulfilment of the first transaction request, the first storage structure 52 may omit storing information relating to the first transaction request in the first transaction queue 54 for at least one stage of fulfilment of the first transaction request. In this way, the first storage structure 52 delegates responsibility for fulfilment of the first request to the second storage structure increasing the available capacity of the first transaction queue 54 for the at least one stage of fulfilment of the first transaction request.

Figure 3:
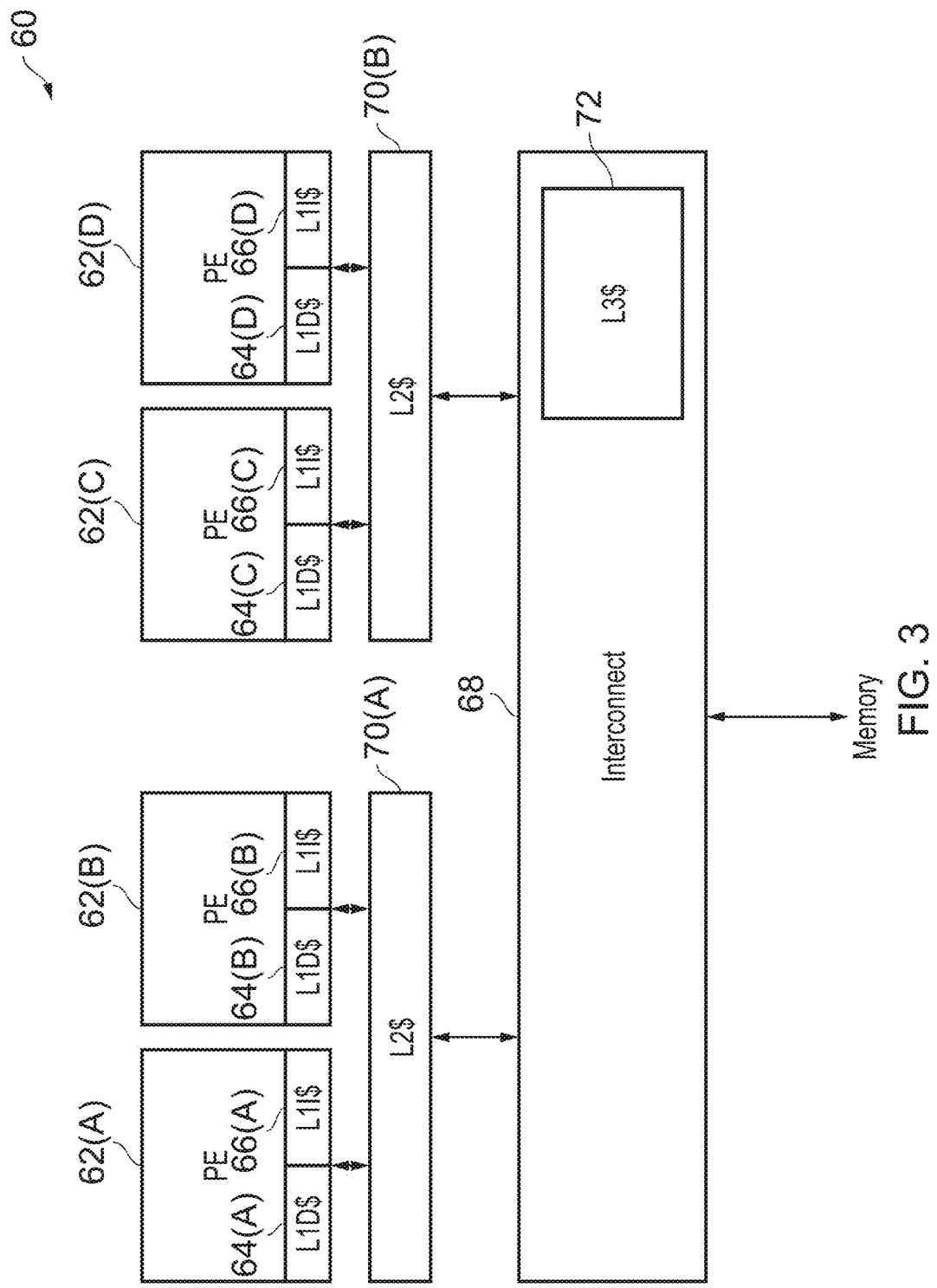
FIG. 3 schematically illustrates an apparatus according to some configurations of the present techniques.

FIG. 3 schematically illustrates an apparatus 60 according to some configurations of the present techniques. The apparatus 60 is provided with a plurality of processing elements 62 including a first processing element 62(A), a second processing element 62(B), a third processing element 62(C), and a fourth processing element 62(D). Each of the processing elements 62 is provided with an L1 data cache 64 and an L1 instruction cache 66. The first processing element 62(A) and the second processing element 62(B) share an L2 cache 70(A). The third processing element 62(C) and the fourth processing element 62(D) share an L2 cache 70(B). The processing elements 62 are coupled, via their respective L2 caches 70 to an interconnect 68 comprising an L3 cache 72 which is also coupled to a main memory.

In general, a transaction request for a data item issued from one of the processing elements 62 may be fulfilled through an initial lookup in the L1 cache 66 and, in response to the initial lookup in the L1 cache 66 missing, a transaction request may be issued to the L2 cache 70. Subsequently if a lookup in the L2 cache 70 also misses, then the L2 cache 70 may issue a transaction request to the L3 cache 72 which, in turn, may issue a transaction request to main memory. The first storage structure and the second storage structure described above may comprise any of the described caches. For example, in some configurations the first storage structure may be one of the L1 data caches 66 or one of the L1 instruction caches 64 with the second storage structure being provided as the L2 cache 70 or the L3 cache 72. Alternatively, the first storage structure may be provided as the L2 cache 70 with the second storage structure being provided as the L3 cache 72. It will be readily apparent to the skilled person that further levels of cache could be provided as one or both of the first storage structure and the second storage structure.

The behaviour of the first storage structure in response to receipt of one or more requests will now be described by way of a number of examples.

Figure 4:
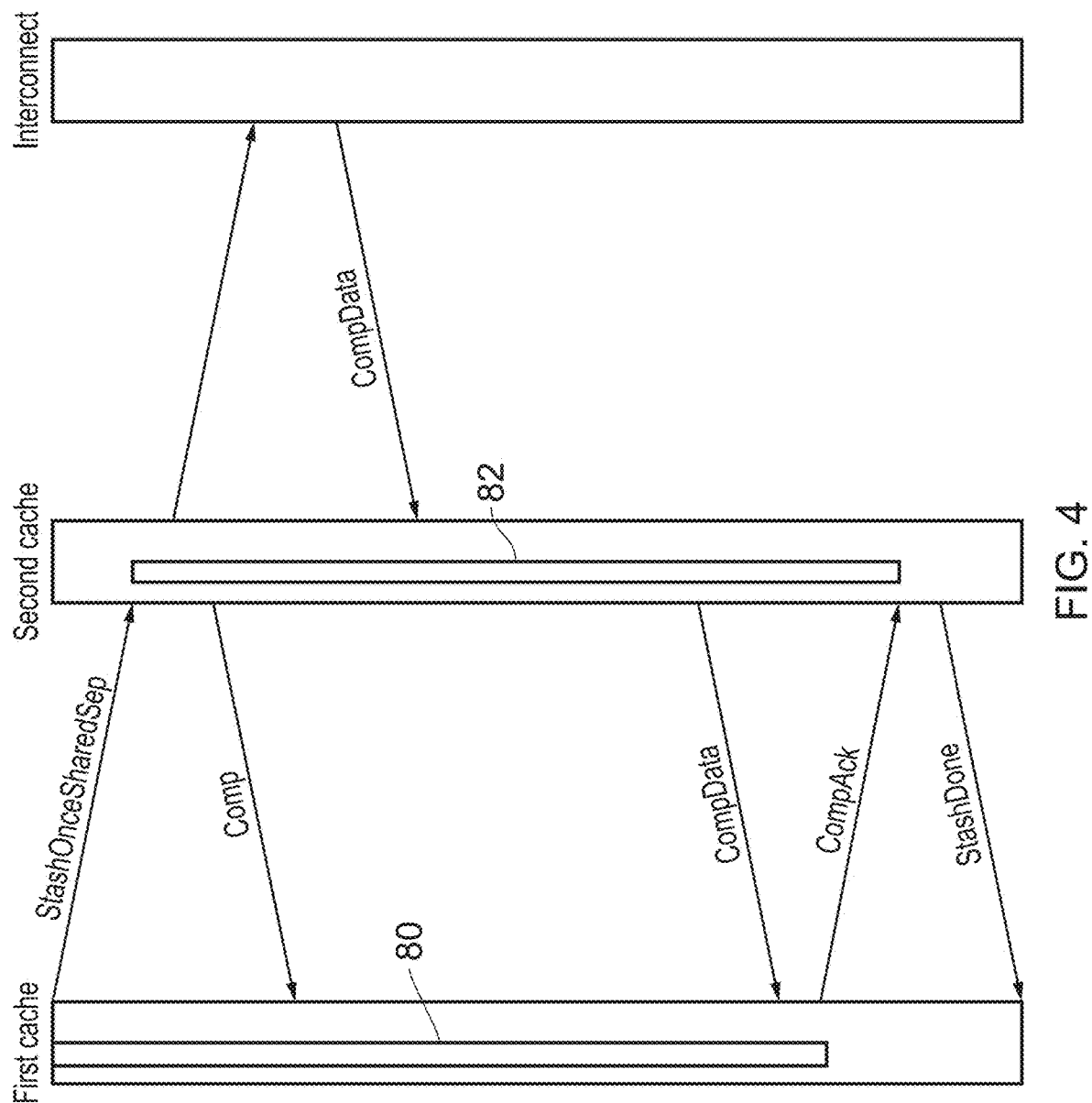
FIG. 4 schematically illustrates interactions between a first cache, a second cache, and an interconnect according to some configurations of the present techniques.

FIG. 4 schematically illustrates an interaction between a first cache (an example of first storage circuitry), a second cache (an example of second storage circuitry) and an interconnect. The illustrated example highlights the tracking of transaction request in transaction queues when the received request is not of the given request type. In particular, the first cache receives a first request for a data item and performs an initial lookup in the set of first data items stored in that cache. When the first cache identifies that the data item is not present in the set of first data items stored in the cache, the first cache issues a first transaction request to the second cache (a StashOnceSharedSep transaction). In addition, the first cache stores first transaction data 80 identifying the first transaction request in the first transaction queue. The second cache receives the first transaction request and proceeds to perform a lookup in the second set of data items stored in the second cache. In the illustrated configuration the lookup performed by the second cache misses and the second cache issues a second transaction request to the interconnect. The second cache stores second transaction data 82 identifying the second transaction request in the second transaction queue and sends an acknowledgement signal (Comp) back to the first cache. Because the request received by the first cache is not of the given request type, the first cache retains the first transaction data 80 in the first transaction queue. Meanwhile, the second cache forwards a second transaction request to the interconnect which takes steps to trigger the requested data to be retrieved. The requested data is returned to the second cache (CompData). Subsequently, the second cache triggers the return of the data received from the interconnect to the first cache (CompData). The first cache, on receipt of the data transmits an acknowledgement signal to the second cache (CompAck) and invalidates (or otherwise deallocates) the first transaction data 80 from the transaction queue. On receipt of the acknowledgement signal the second cache deallocates the second transaction data 82 from the second transaction queue and indicates to the first cache that the transaction is complete (StashDone). Whilst the transaction is outstanding, data identifying the transaction is therefore stored in the first transaction queue, and the second transaction queue.

Figure 5A:
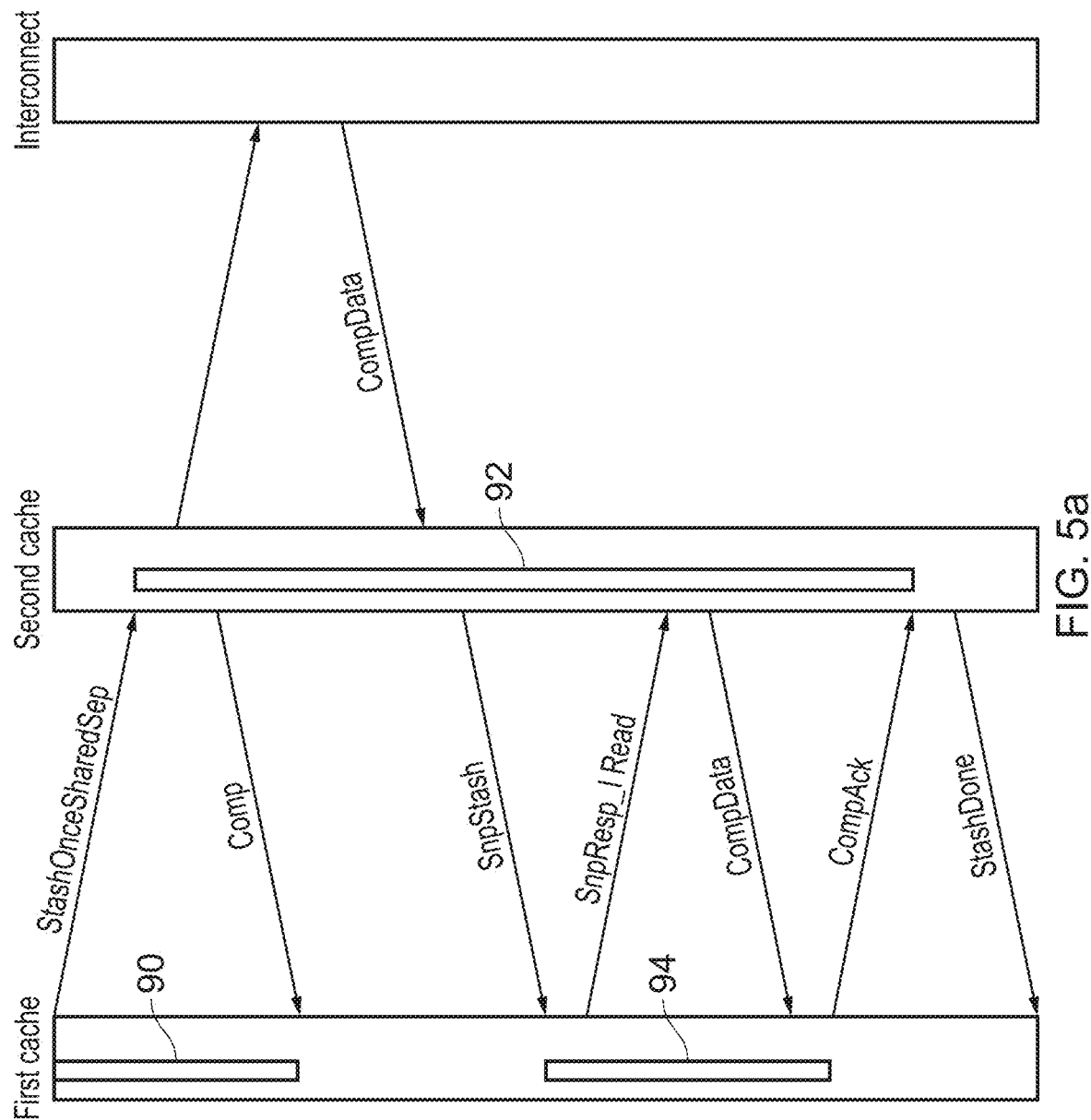
FIG. 5a schematically illustrates interactions between a first cache, a second cache, and an interconnect according to some configurations of the present techniques.

FIG. 5a schematically illustrates an example interaction between the first cache, the second cache and the interconnect when the first request is of the given transaction type. In particular, the first cache receives a first request for a data item and performs an initial lookup in the set of first data items stored in that cache. When the first cache identifies that the data item is not present in the set of first data items stored in the cache, the first cache issues a first transaction request to the second cache (StashOnceSharedSep). In addition, the first cache stores first transaction data 90 identifying the first transaction request in the first transaction queue. The second cache receives the first transaction request and proceeds to perform a lookup in the second set of data items stored in the second cache. In the illustrated configuration the lookup performed by the second cache misses and the second cache issues a second transaction request to the interconnect. The second cache stores second transaction data 92 identifying the second transaction request in the second transaction queue and sends an acknowledgement signal (Comp) back to the first cache. Because the request received by the cache is of the given request type, the first cache is able to delegate responsibility for tracking the outstanding first transaction request to the second cache. Hence, the first cache is responsive to receipt of the acknowledgement signal (Comp) to deallocate (e.g., invalidate) the first transaction data 90 in the first transaction queue. This frees up space in the first transaction queue for further transactions. Meanwhile, the second cache forwards a second transaction request to the interconnect which takes steps to trigger the requested data to be retrieved. The requested data is returned to the second cache (CompData). On receipt of the requested data, the second cache issues a data available signal (SnpStash) to the first cache. On receipt of the data available signal, the first cache reallocates first transaction identifying data 94 into the first transaction queue and sends a read request (SnpResp_I Read) to the second cache to trigger a data pull for the data to be transmitted to the first cache. Subsequently, the second cache triggers the return of the data received from the interconnect to the first cache (CompData). The first cache, on receipt of the data transmits an acknowledgement signal to the second cache (CompAck) and invalidates (or otherwise deallocates) the first transaction data 94 from the transaction queue. On receipt of the acknowledgement signal the second cache deallocates the second transaction data 92 from the second transaction queue and indicates to the first cache that the transaction is complete (StashDone). Whilst the transaction is outstanding, data identifying the transaction is therefore only stored in the first transaction queue for some of the stages of the transaction with the responsibility for fulfilling the transaction request delegated to the second cache for at least one stage of the transaction.

Figure 5B:
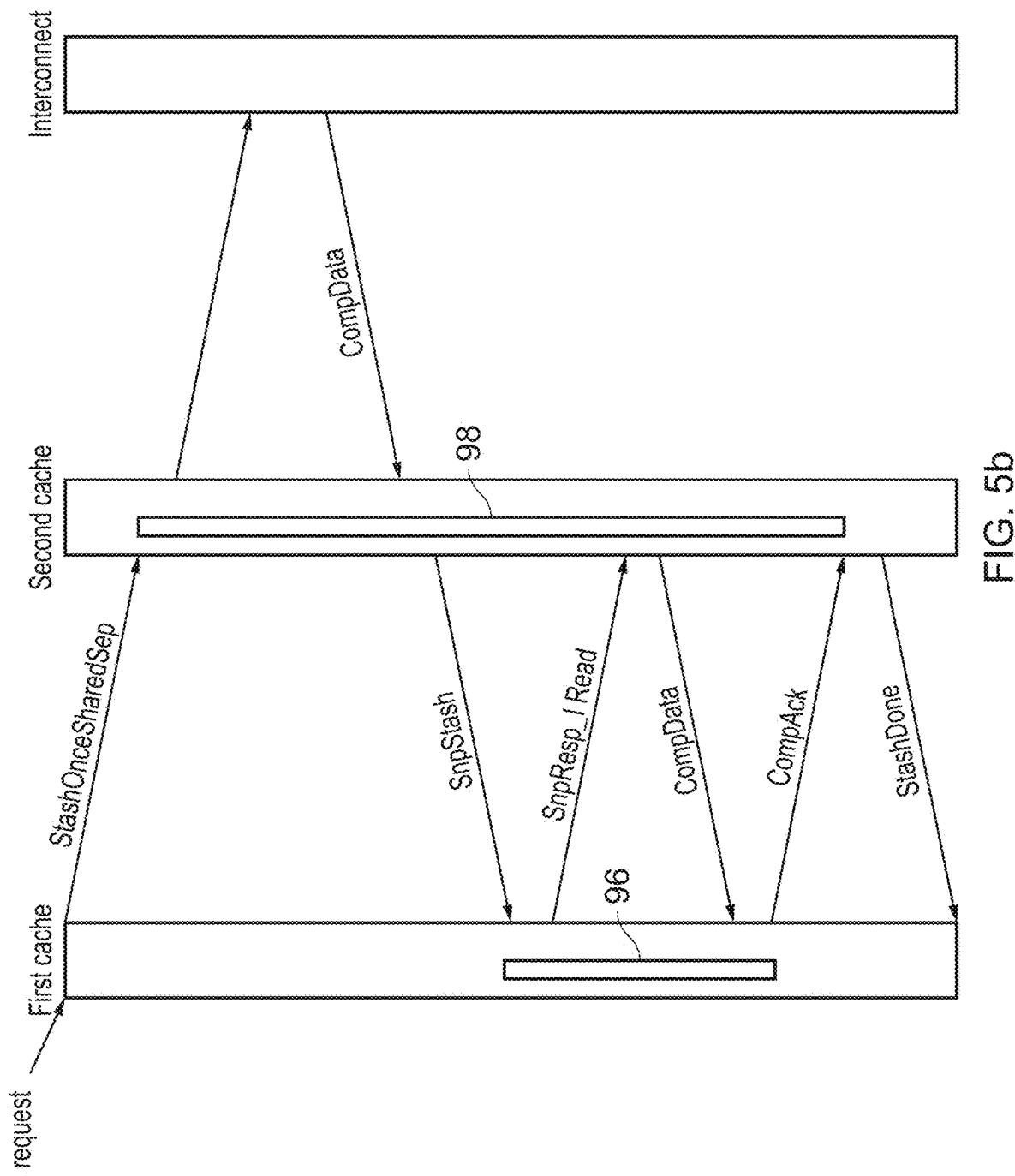
FIG. 5b schematically illustrates interactions between a first cache, a second cache, and an interconnect according to some configurations of the present techniques.

FIG. 5b schematically illustrates a further example interaction between the first cache, the second cache and the interconnect when the first request is of the given transaction type. In particular, the first cache receives a first request for a data item and performs an initial lookup in the set of first data items stored in that cache. When the first cache identifies that the data item is not present in the set of first data items stored in the cache, the first cache issues a first transaction request to the second cache (StashOnceSharedSep). Unlike the case described in relation to FIG. 5a, the first cache does not allocate any transaction data into the first transaction queue. The second cache receives the first transaction request and proceeds to perform a lookup in the second set of data items stored in the second cache. In the illustrated configuration the lookup performed by the second cache misses and the second cache issues a second transaction request to the interconnect. The second cache stores second transaction data 98 identifying the second transaction request in the second transaction queue and takes over responsibility for fulfilment of the request. As the first cache has fully delegated the responsibility of tracking the transaction request, there is no need for the second cache to send an acknowledgement signal (although it will be readily apparent to the skilled person that any such acknowledgement could be sent and overlooked by the first cache). The second cache forwards a second transaction request to the interconnect which takes steps to trigger the requested data to be retrieved. The requested data is returned to the second cache (CompData). On receipt of the requested data, the second cache issues a data available signal (SnpStash) to the first cache. On receipt of the data available signal, the first cache allocates first transaction identifying data 96 into the first transaction queue and sends a read request (SnpResp_I Read) to the second cache to trigger a data pull for the data to be transmitted to the first cache. Subsequently, the second cache triggers the return of the data received from the interconnect to the first cache (CompData). The first cache, on receipt of the data transmits an acknowledgement signal to the second cache (CompAck) and invalidates (or otherwise deallocates) the first transaction data 96 from the transaction queue. On receipt of the acknowledgement signal the second cache deallocates the second transaction data 98 from the second transaction queue and indicates to the first cache that the transaction is complete (StashDone). Whilst the transaction is outstanding, data identifying the transaction is therefore only stored in the first transaction queue for some of the stages of the transaction with the responsibility for fulfilling the transaction request delegated to the second cache for at least one stage of the transaction.

Figure 6:
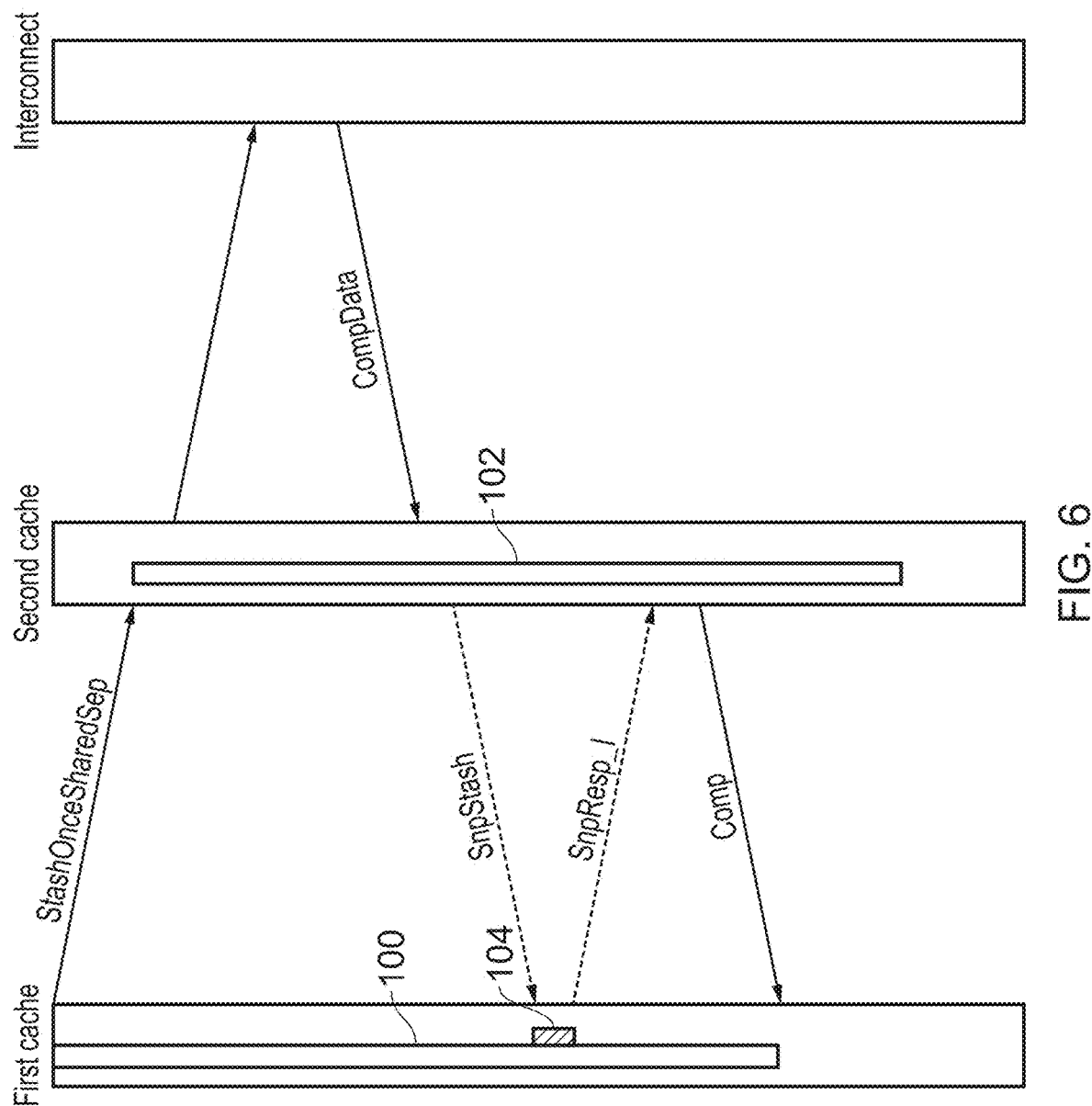
FIG. 6 schematically illustrates interactions between a first cache, a second cache, and an interconnect according to some configurations of the present techniques.

FIG. 6 schematically illustrates an example of a case in which the data available signal is received by the first cache subsequent to the first transaction request being issued but before the acknowledgement signal is received by the first cache. The initial receipt of the transaction, allocation of the first transaction data 100 into the first transaction queue and allocation of the second transaction data 102 into the second transaction queue proceeds as described in relation to FIGS. 4 and 5a. However, in the illustrated configuration, the data is already being retrieved into the second cache, for example, due to an earlier request. The second cache responds with the data available signal (SnpStash). The first cache receives the data available signal (SnpStash) and attempts to allocate a transaction in the first transaction queue 104. However, the first transaction queue already has an entry 100 corresponding to the requested data. The first cache issues a response (SnpResp_I) to the second cache indicating the hazard in the first transaction queue but without triggering a data pull. The second cache transmits an acknowledgement signal but does not return the data to the first cache (Comp) and the first cache deallocates the first transaction data 100. The transaction may then be replayed.

Figure 7:
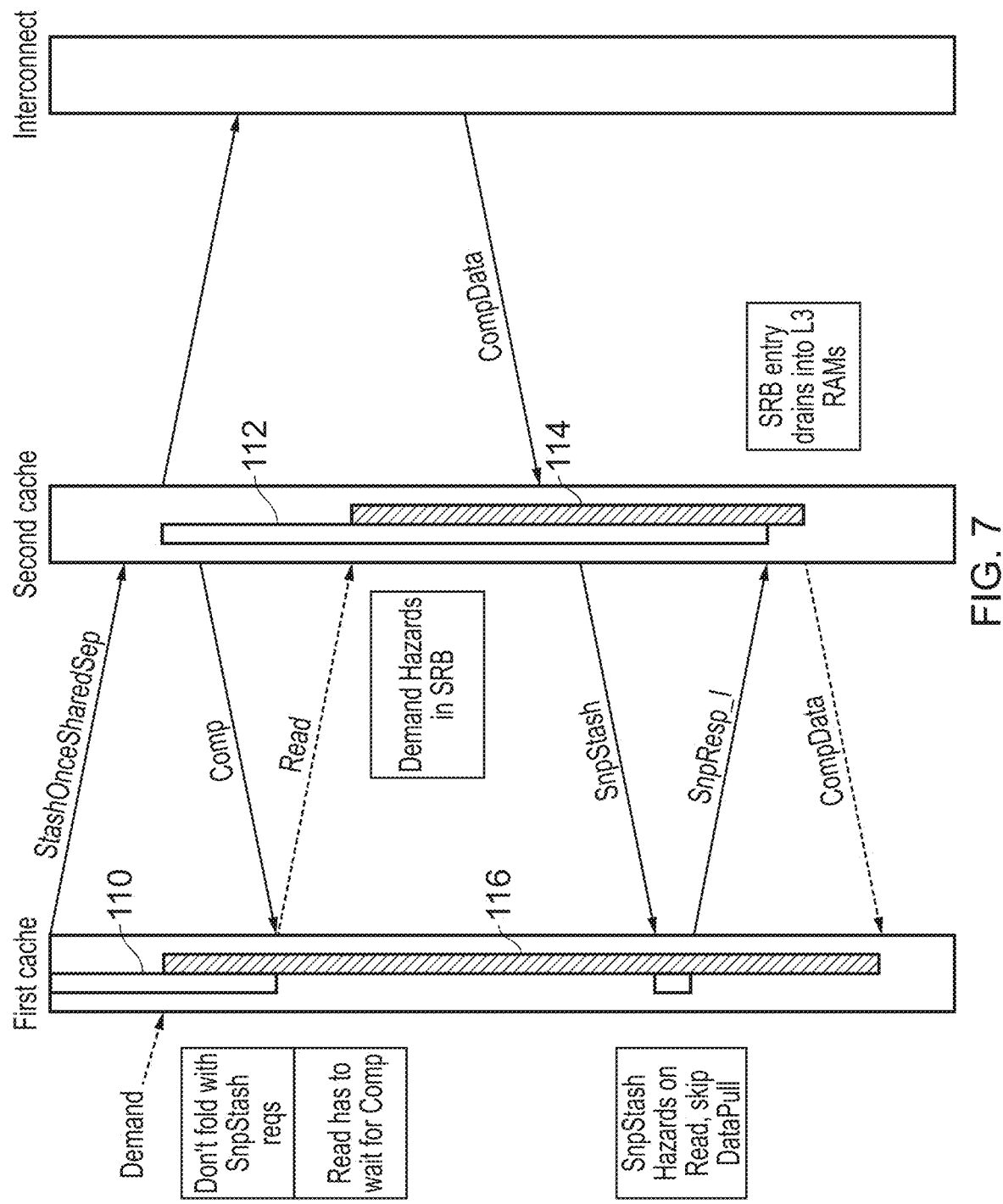
FIG. 7 schematically illustrates interactions between a first cache, a second cache, and an interconnect according to some configurations of the present techniques.
Figure 8:
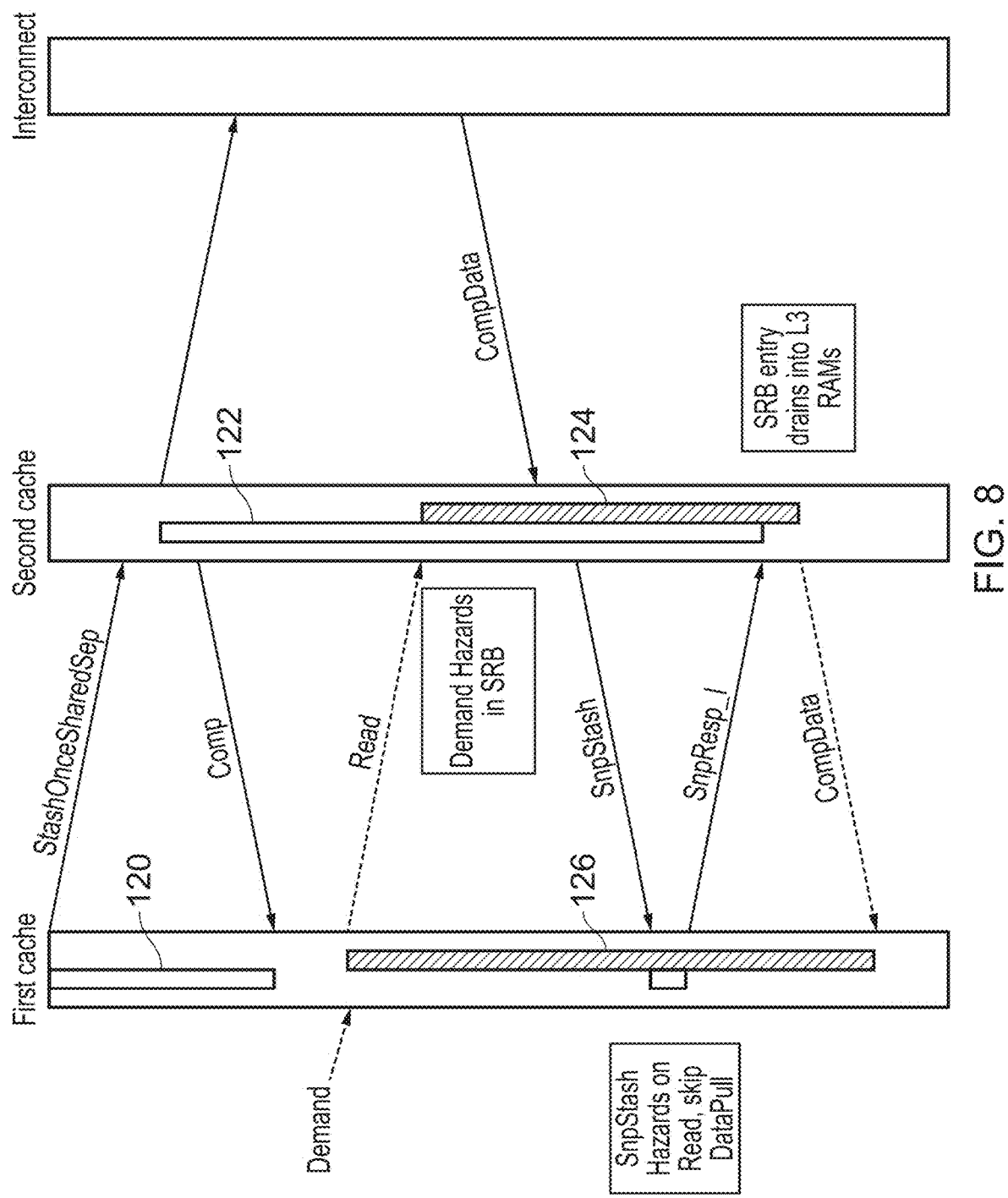
FIG. 8 schematically illustrates interactions between a first cache, a second cache, and an interconnect according to some configurations of the present techniques.

FIGS. 7 and 8 schematically illustrate examples of a response of the first cache to a further request for a given data item whilst there is an outstanding first transaction request for the same given data item. In the illustrated examples, the further request is a demand request.

FIG. 7 schematically illustrates an example in which first cache and the second cache respond to a first request as described in relation to FIG. 5a. In absence of receipt of the further request, the allocation into the first transaction queue and the second transaction queue, and the flow of data between the first cache, the second cache and the interconnect would proceed as in FIG. 5a. However, the further request is received subsequent to transmission of the first transaction request (StashOnceSharedSep) and before the receipt of the acknowledgement signal (Comp). Hence, when the further request is received, the first transaction data 110 has already been allocated into the first transaction queue and the allocation of second transaction data 112 into the second transaction queue has already been triggered. The further request is a request for the same given data item as is requested in the first request. On receipt of the further request, the first cache identifies, from the first transaction data 110, that there is an outstanding request for the given data item. The first cache allocates further transaction data 116 into the first transaction queue to track the further request. On receipt of the acknowledgement signal (Comp) from the second cache, the first cache deallocates the first transaction data 110 from the first transaction queue. In addition, the first cache issues a read request to the second cache to read the given data item. The second cache receives the read request and allocates a further second transaction data 114 into the second transaction queue. Because the second transaction queue already contains second transaction data 112 identifying a second transaction request to retrieve data from the interconnect, the second cache does not issue a further request for the data. When the interconnect returns the data (CompData), the second cache issues a data available signal (SnpStash) to the first cache. The first cache receives the data available signal and performs a lookup in the transaction queue. The first cache identifies that there is an outstanding demand request for the given data item and skips the re-allocation of the first transaction data into the first transaction queue. The first cache sends a response back to the second cache (SnpResp_I) indicating the hazard in the first transaction queue, but avoids issuing a data pull to pull the data from the second cache because there is already an outstanding read transaction issued in response to the further request. The second cache responds by deallocating the second transaction data 112 from the second transaction queue. In response to the read transaction issued by the first cache the second cache transmits the given data item to the first cache (CompData) and deallocates the further second transaction data 114. On receipt of the given data item the first cache deallocates the further transaction data 116.

FIG. 8 schematically illustrates a further example, similar to the example described in relation to FIG. 7. In the illustrated example, the further request is received subsequent to transmission of the first transaction request (StashOnceSharedSep) and subsequent to the receipt of the acknowledgement signal (Comp). Hence, when the further request is received, the first transaction data 120 has already been allocated into the first transaction queue and subsequently deallocated. Furthermore, the second transaction data 122 has already been allocated into the second transaction queue. Because the acknowledgement has been received at the point the further request is received, further transaction data 126 is allocated into the first transaction queue and the read request can be issued straight away to trigger allocation of the further second transaction data 124 into the second cache. The remainder of the interactions between the first cache and the second cache proceed as described in relation to FIG. 7.

Figure 9:
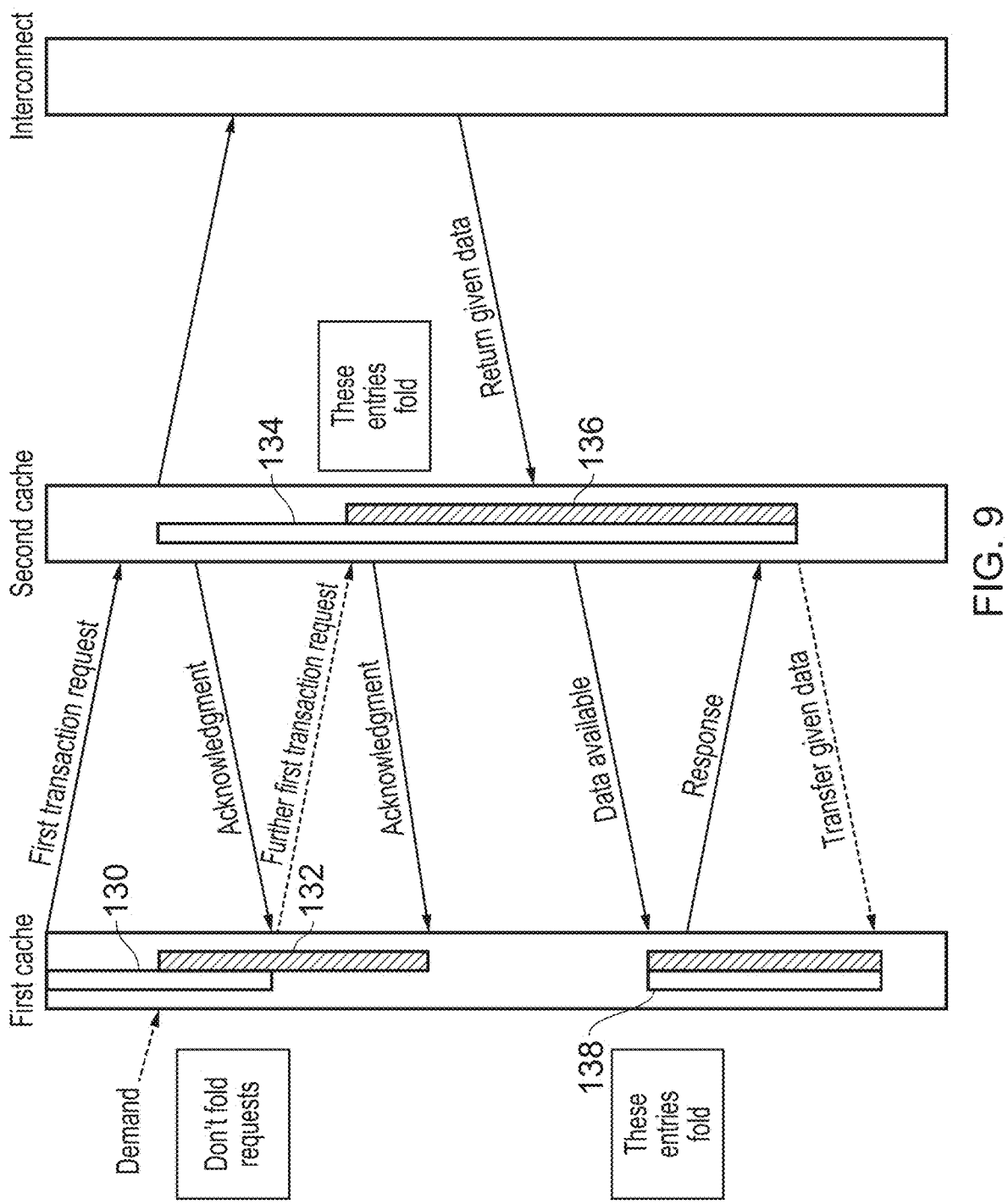
FIG. 9 schematically illustrates interactions between a first cache, a second cache, and an interconnect according to some configurations of the present techniques.

FIG. 9 schematically illustrates a further example interaction between the first cache, the second cache and the interconnect. The example set out in FIG. 9 is similar to the one set out in FIG. 7. However, in contrast to FIG. 7, in FIG. 9 the further transaction data resulting from the demand request is not retained in the first transaction queue through all stages of fulfilment. Rather, responsibility for fulfilment of at least some stages of the further request is delegated to the second cache. In the illustrated example, the further request is received subsequent to transmission of the first transaction request and before the receipt of the acknowledgement signal. Hence, when the further request is received, the first transaction data 130 has already been allocated into the first transaction queue and the allocation of second transaction data 134 into the second transaction queue has already been triggered. The further request is a request for the same given data item as is requested in the first request. On receipt of the further request, the first cache identifies, from the first transaction data 130, that there is an outstanding request for the given data item. The first cache allocates further transaction data 132 into the first transaction queue to track the further request. On receipt of the acknowledgement signal from the second cache, the first cache deallocates the first transaction data 130 from the first transaction queue. In addition, the first cache issues a further first transaction request to the second cache. The second cache receives the further first transaction request and allocates a further second transaction data 136 into the second transaction queue. The second transaction data 134 and the further second transaction data 136 are both indicative of a same request time for the same data item and, hence, these transaction data can be folded (i.e., merged) into a single entry. The second cache issues an acknowledgement signal to acknowledge the further first transaction request which causes the first cache to deallocate the further transaction data 132 from the first transaction queue. At this stage the second cache is responsible for fulfilment of both transaction requests. Once the data is returned by the interconnect, the second cache issues a data available signal to the first cache indicating that the data is available for both the first request and the further request. The first cache allocates a combined (folded) entry 138 into the first transaction queue to track the fulfilment of retrieving the given data item into the first cache to satisfy the first request and the further request. The first cache then issues a response to the second cache. The second cache responds by issuing the given data item to the first cache. The second cache then deallocates the folded second transaction data 134 and further second transaction data 136 from the second transaction queue. On receipt of the given data item, the first cache deallocates the combined entry 138 from the first transaction queue.

Figure 10:
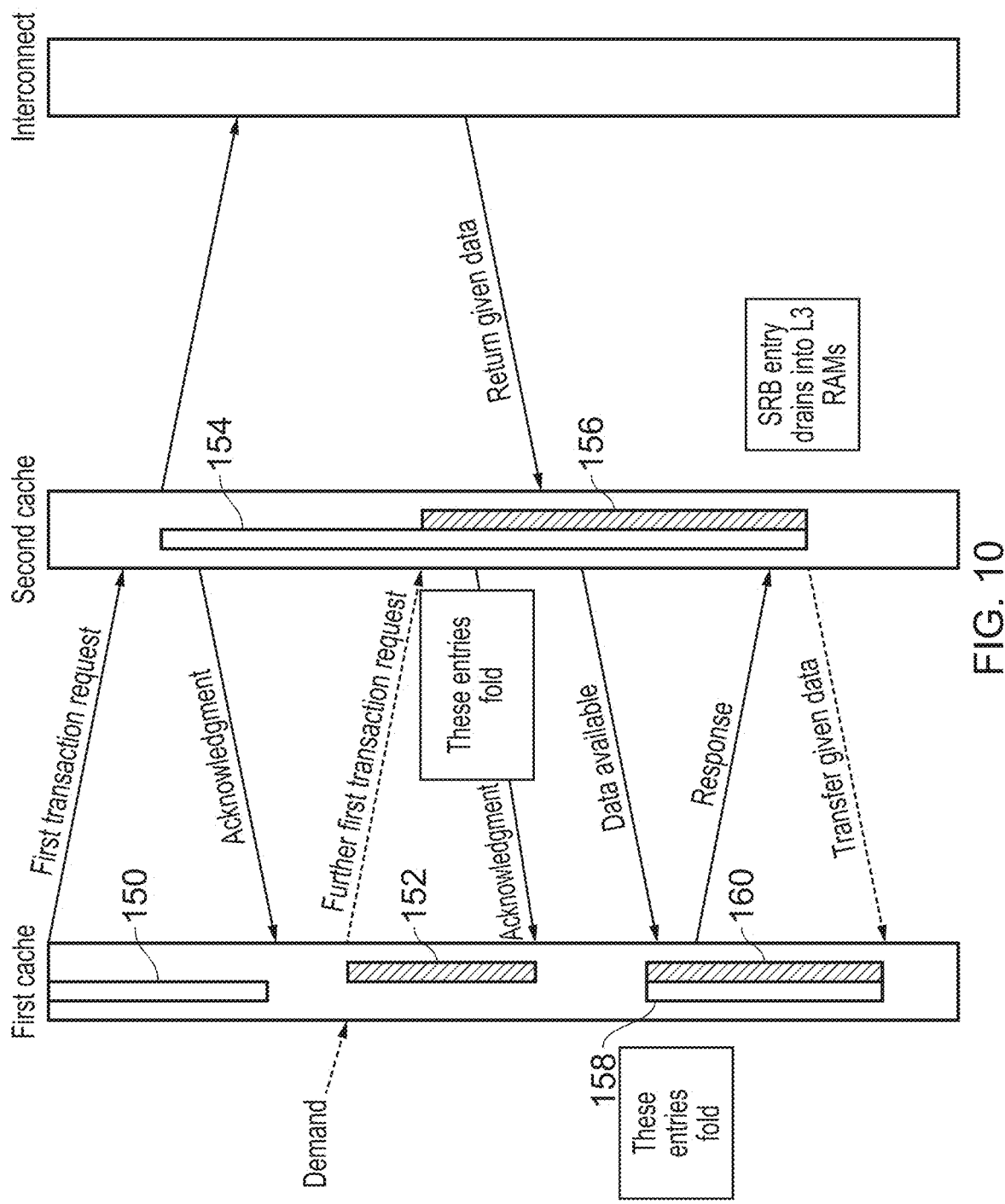
FIG. 10 schematically illustrates interactions between a first cache, a second cache, and an interconnect according to some configurations of the present techniques.

FIG. 10 schematically illustrates a further example, similar to the example described in relation to FIG. 9. In the illustrated example, the further request is received subsequent to transmission of the first transaction request and subsequent to the receipt of the acknowledgement signal. Hence, when the further request is received, the first transaction data 150 has already been allocated into the first transaction queue and subsequently deallocated. Furthermore, the second transaction data 154 has already been allocated into the second transaction queue. Because the acknowledgement has been received at the point the further request is received, further transaction data 152 is allocated into the first transaction queue and the data request can be issued straight away to trigger allocation of the further second transaction data 156 into the second cache. The remainder of the interactions between the first cache and the second cache proceed as described in relation to FIG. 9 with first cache allocating a combined entry 158 in response to the data available signal.

Figure 11:
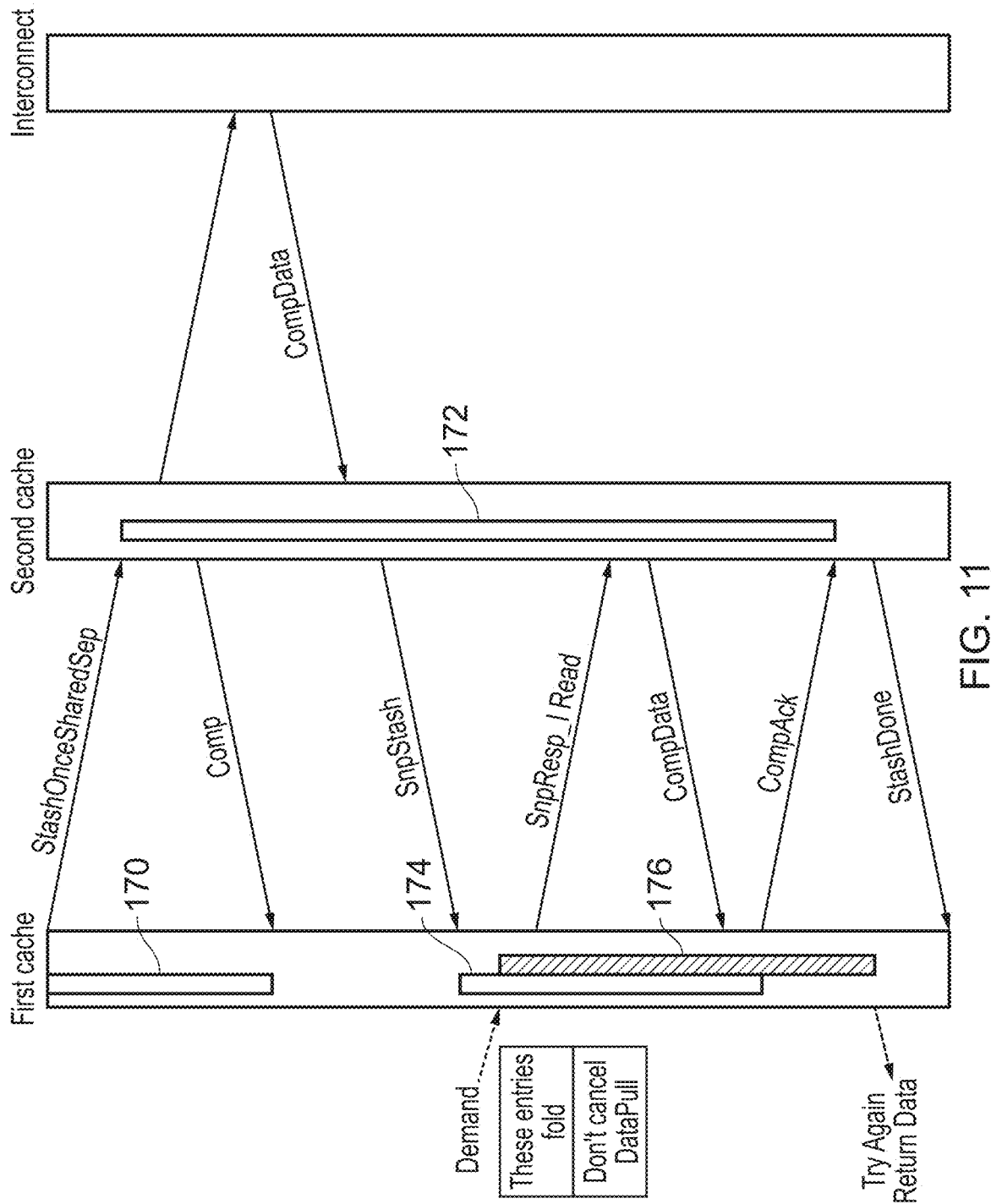
FIG. 11 schematically illustrates interactions between a first cache, a second cache, and an interconnect according to some configurations of the present techniques.
Figure 12:
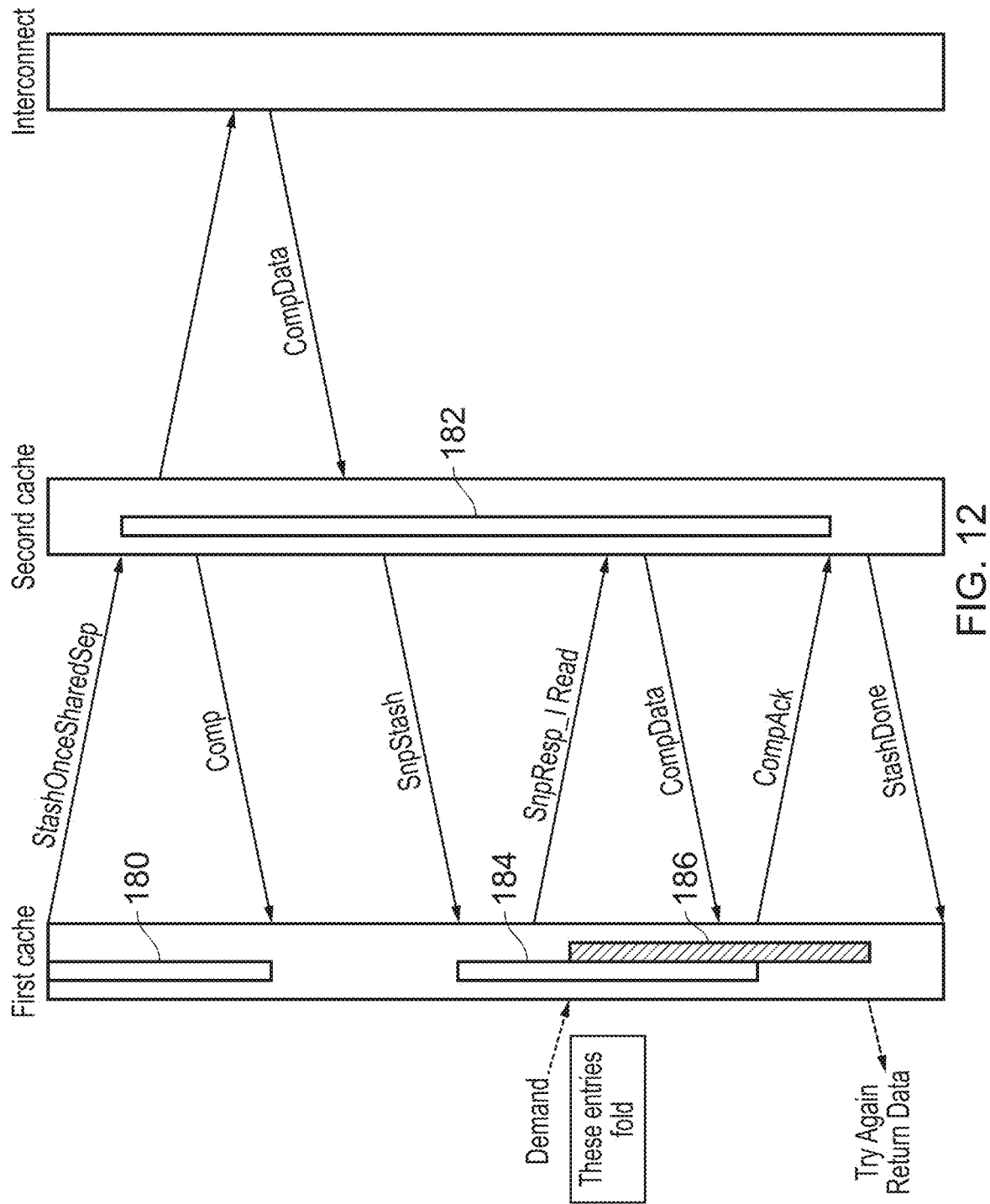
FIG. 12 schematically illustrates interactions between a first cache, a second cache, and an interconnect according to some configurations of the present techniques.
Figure 13:
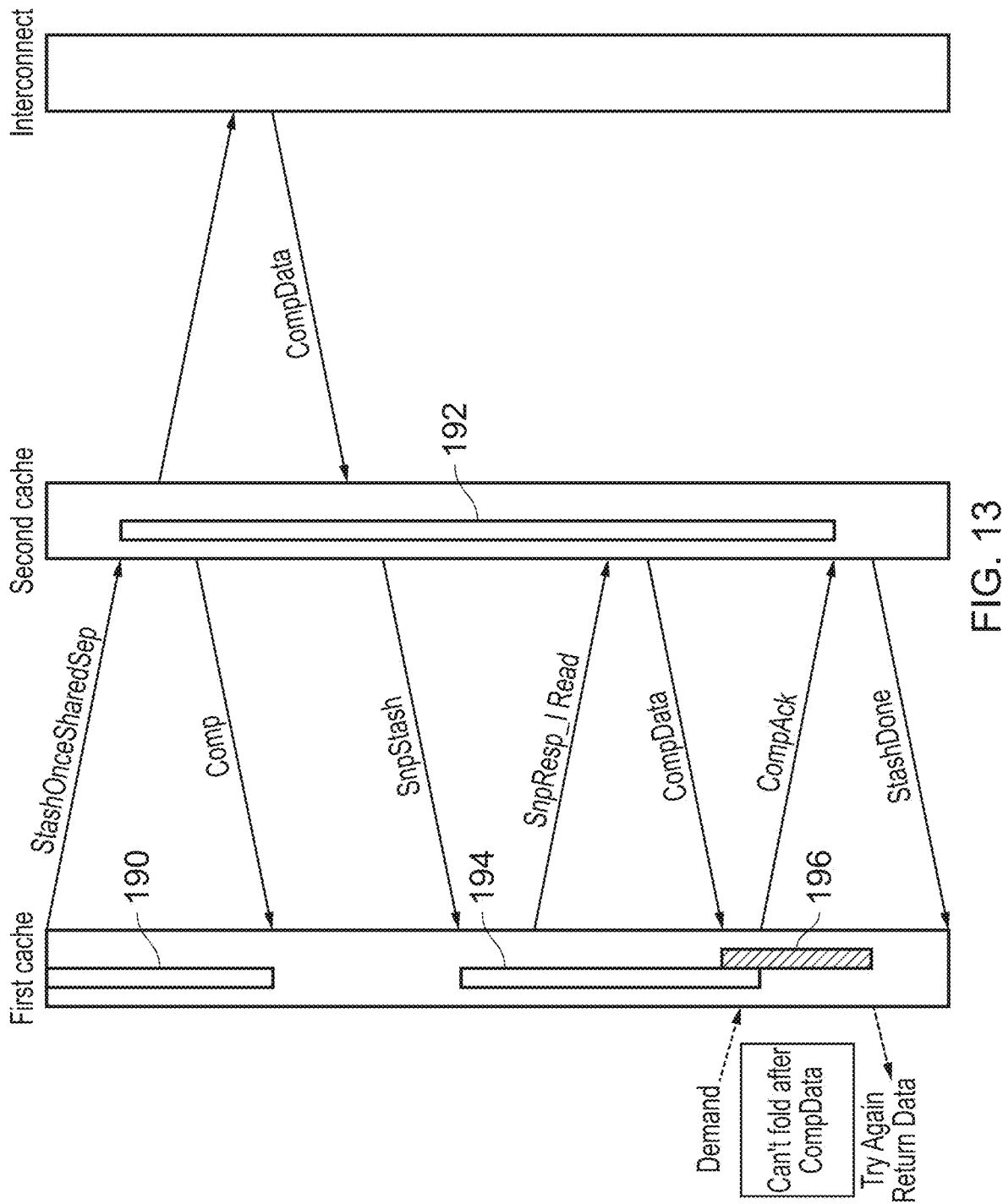
FIG. 13 schematically illustrates interactions between a first cache, a second cache, and an interconnect according to some configurations of the present techniques.

FIGS. 11 to 13 schematically illustrate a further variant on the example timing at which the further request is received as described in relation to FIGS. 7 and 8.

In the illustrated example of FIG. 11, the further request is received subsequent to transmission of the data available signal (SnpStash) by the second cache. Hence, when the further request is received, the first transaction data 170 has already been allocated into the first transaction queue and subsequently deallocated. The second transaction data 172 has also already been allocated into the second transaction queue. Furthermore, because the data available signal has been received by the first cache, the first transaction data 174 has been reallocated into the first transaction queue. Because the data available signal has been received at the point the further request is received, further transaction data 176 is allocated into the first transaction queue and the further transaction data 176 is folded (combined) with the first transaction data 174. The first cache then proceeds to issue a data pull to retrieve the given data item from the second cache as it would have done in the event that the further request had not been received. Subsequently, the given data item is returned to the first cache and the second transaction data 172 and the first transaction data 174 are deallocated. The first cache also returns the given data item in response to the demand request and deallocates the further transaction data 176 from the first transaction queue.

In the illustrated example of FIG. 12, the further request is received subsequent to transmission of the read request from the first cache. Hence, when the further request is received, the first transaction data 180 has already been allocated into the first transaction queue and subsequently deallocated. The second transaction data 182 has also already been allocated into the second transaction queue. Furthermore, because the data available signal has been received by the first cache, the first transaction data 184 has been reallocated into the first transaction queue. Because the read request has been transmitted at the point the further request is received, further transaction data 186 is allocated into the first transaction queue and the further transaction data 186 is folded (i.e., combined or merged) with the first transaction data 184. The first cache then proceeds to issue a data pull to retrieve the given data item from the second cache as it would have done in the event that the further request had not been received. Subsequently, the given data item is returned to the first cache and the second transaction data 182 and the first transaction data 184 are deallocated. The first cache also returns the given data item in response to the demand request and deallocates the further transaction data 186 from the first transaction queue.

In the illustrated example of FIG. 13, the further request is received subsequent to receipt of the given data item from the second cache. Hence, when the further request is received, the first transaction data 190 has already been allocated into the first transaction queue and subsequently deallocated. The second transaction data 192 has also already been allocated into the second transaction queue. Furthermore, because the data has been received by the first cache, the first transaction data 194 has been reallocated into the first transaction queue. Because the data has been received by the first cache it is no longer possible to fold the further transaction data 196 with the first transaction data 194 and the first cache and the second cache proceed to communicate to deallocate the first transaction data 194 and the second transaction data 192. At this stage, the first cache has a copy of the given data item and can service the further request. In the event that the further request is received by the first cache whilst the given data item is being allocated, i.e., once it has been received but before it is available, the further data request may be stalled or replayed.

Figure 14:
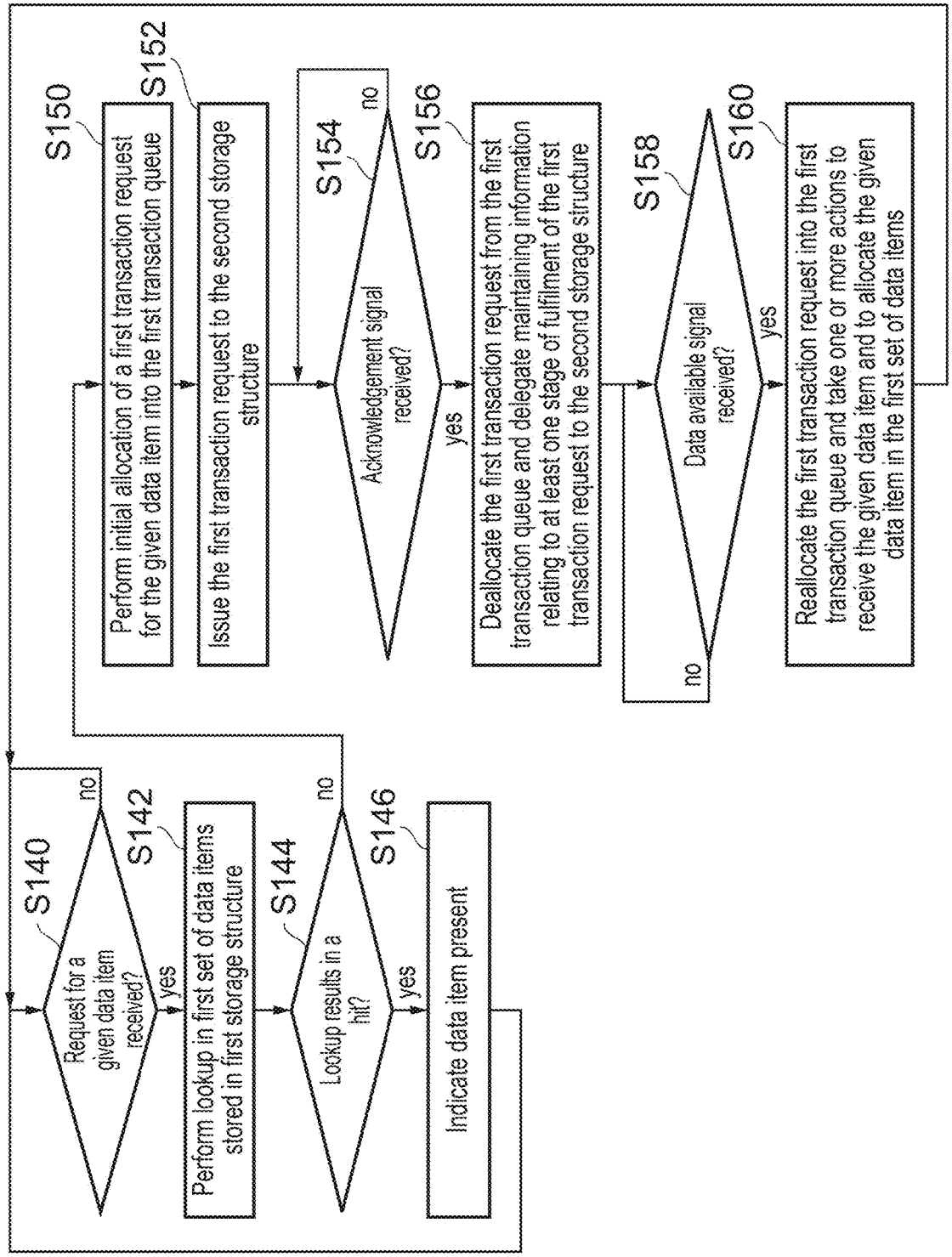
FIG. 14 schematically illustrates a sequence of steps carried out according to some configurations of the present techniques.

FIG. 14 schematically illustrates a sequence of steps carried out according to some configurations of the present techniques. Flow begins at step S140 where it is determined if a request for a given data item has been received by the first storage circuitry. If, at step S140, it is determined that no request has been received, then flow remains at step S140. If, at step S140, it is determined that a request for the given data item has been received, then flow proceeds to step S142. At step S142 a lookup is performed in the first set of data items stored in the first storage structure to determine if the given data item is amongst the first set of data items. Flow then proceeds to step S144 where it is determined if the lookup in the first set of data items resulted in a hit. If, at step S144, it was determined that the lookup resulted in a hit, then flow proceeds to step S146 where the presence of the data item is indicated. Where the request is a demand request, the first storage structure may return the data item, where the request is a prefetch request to trigger the given data item to be pulled into the first storage structure, then no further action may be taken and flow returns to step S140. If, at step S144, it was determined that the lookup did not result in a hit, then flow proceeds to step S150. At step S150, an initial allocation of first transaction data indicative of a first transaction request is performed in the first transaction queue. Flow then proceeds to step S152 where the first transaction request is issued to the second storage structure. Flow then proceeds to step S154 where it is determined if an acknowledgement signal has been received. If, at step S154, it is determined that no acknowledgement signal has been received, then flow remains at step S154. If, at step S154, it is determined that an acknowledgement signal has been received, then flow proceeds to step S156. At step S156, the first transaction data is deallocated from the first transaction queue. At this point, the maintenance of information relating to the fulfilment of the first transaction request is delegated to the second storage structure. Flow then proceeds to step S158 where it is determined if a data available signal has been received. If, at step S1568, it is determined that no data available signal has been received, then flow remains at step S158. If, at step S158, it is determined that a data available signal has been received, then flow proceeds to step S160 where the first storage structure reallocates first transaction data into the first transaction queue and takes one or more actions to retrieve the given data item and to allocate it into the first set of data items. Flow then returns to step S140.

Figure 15:
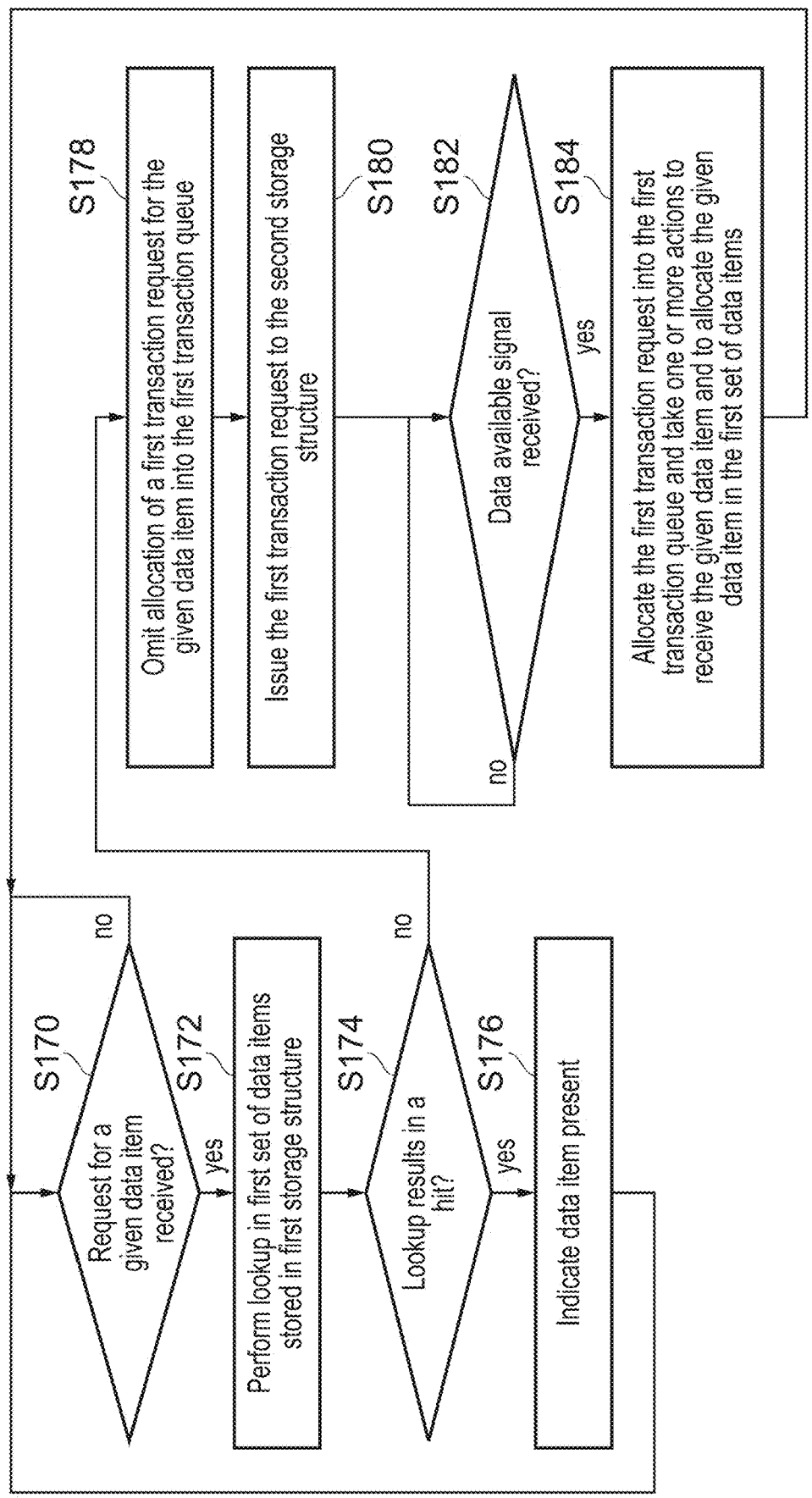
FIG. 15 schematically illustrates a sequence of steps carried out according to some configurations of the present techniques.

FIG. 15 schematically illustrates a sequence of steps carried out according to some configurations of the present techniques. Flow begins at step S170 where it is determined if a request for a given data item has been received by the first storage circuitry. If, at step S170, it is determined that no request has been received, then flow remains at step S170. If, at step S170, it is determined that a request for the given data item has been received, then flow proceeds to step S172. At step S172 a lookup is performed in the first set of data items stored in the first storage structure to determine if the given data item is amongst the first set of data items. Flow then proceeds to step S174 where it is determined if the lookup in the first set of data items resulted in a hit. If, at step S174, it was determined that the lookup resulted in a hit, then flow proceeds to step S176 where the presence of the data item is indicated. Where the request is a demand request, the first storage structure may return the data item, where the request is a prefetch request to trigger the given data item to be pulled into the first storage structure, then no further action may be taken and flow returns to step S170. If, at step S174, it was determined that the lookup did not result in a hit, then flow proceeds to step S178. At step S178, the allocation of first transaction data to the first transaction queue is omitted. Flow then proceeds to step S180 where a first transaction request is issued to the second storage structure. Flow then proceeds to step S182 where it is determined if a data available signal has been received. If, at step S182, it is determined that no data available signal has been received, then flow remains at step S182. If, at step S182, it is determined that a data available signal has been received, then flow proceeds to step S184 where first transaction data is allocated into the first transaction queue and one or more actions are taken to retrieve the given data item and to allocate the given data item into the first set of data items. Flow then returns to step S170.

Figure 16A:
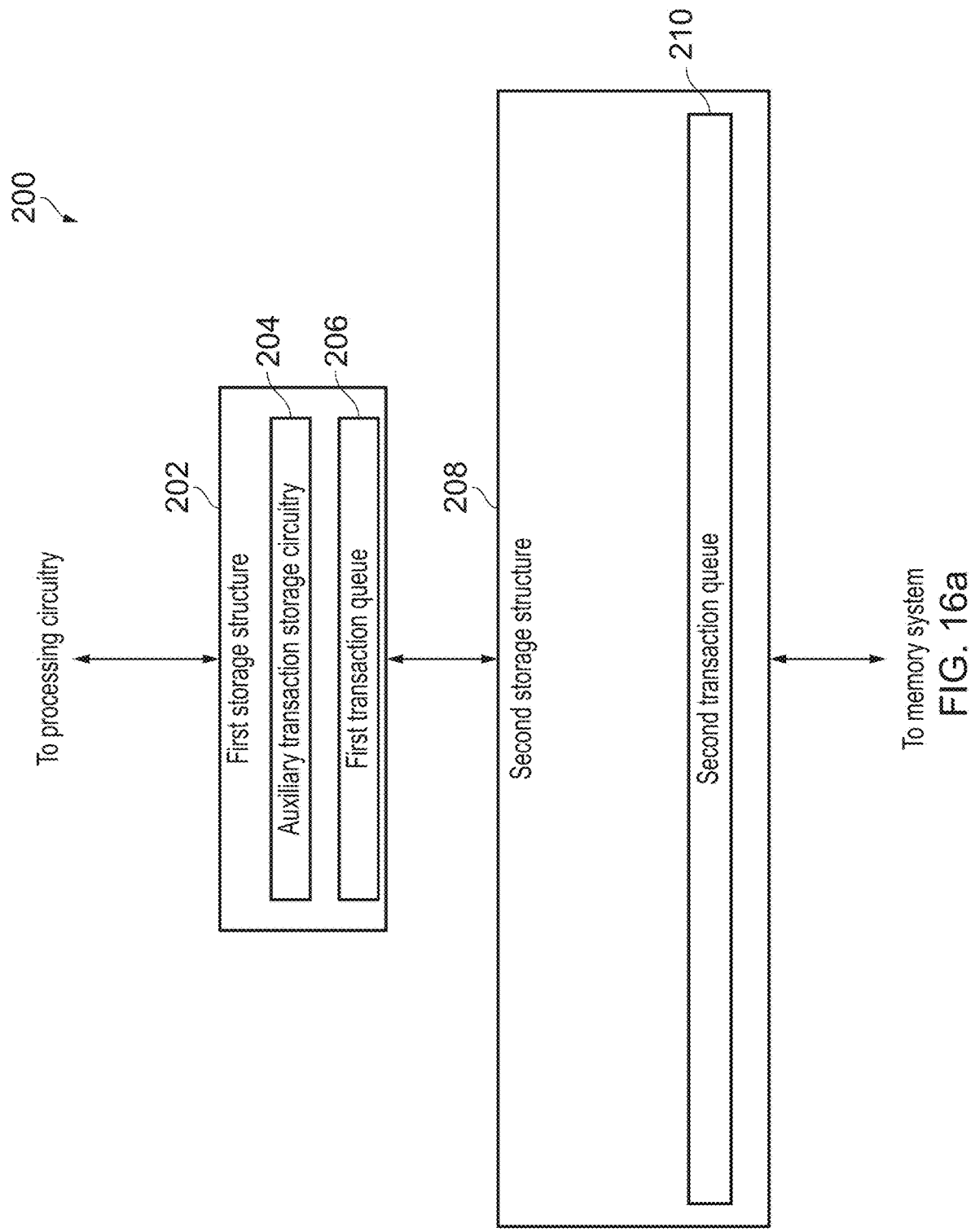
FIG. 16a schematically illustrates an apparatus according to some configurations of the present techniques.

FIG. 16a schematically illustrates an apparatus 200 according to some configurations of the present techniques. The apparatus is provided with a first storage structure 202 and a second storage structure 208. The first storage structure 202 is provided with a first transaction queue 206 to store first transaction data indicative of first transaction requests that are outstanding in order for the first storage structure to ensure that the first transaction requests are fulfilled. The second storage structure 208 is provided with a second transaction queue 210 configured to store second transaction data indicative of second transaction requests that are outstanding in order for the second storage structure to ensure that the second transaction requests are fulfilled. The first storage structure 202 is also provided with an auxiliary transaction storage circuitry 204. The auxiliary transaction storage circuitry 204 is provided as part of the first storage structure 202 and is configured to store a subset of information indicative of outstanding transaction requests. The first storage structure 202 may, in some configurations, be responsive to a received request of the given type as described in relation to FIG. 2. However, the first storage structure 202 may additionally, or as an alternative, be responsive to a received request of a particular type specifying a particular data item to, when the particular data item is not present in the first storage structure 202, to issue a first transaction request to the second storage structure 208 and to omit storing details relating to the first transaction request in the first transaction queue 206 for at least one stage of fulfilment of the first transaction request. Rather, the first storage structure 202 delegates tracking the first transaction request for the at least one stage of fulfilment, to the auxiliary transaction storage circuitry 204. The auxiliary transaction storage circuitry 204 therefore behaves in a similar way to the first transaction queue and allows details of the first transaction request to be tracked to ensure that the first transaction request is fulfilled. The auxiliary transaction storage circuitry 204 therefore complements the existing first transaction queue 206 but allows tracking of some types of transactions to be omitted from that first transaction queue 206. In addition, the auxiliary transaction storage circuitry 204 stores a reduced subset of the data that would be stored in the first transaction queue. For example, the auxiliary transaction storage circuitry 204 may omit storage of at least one item of data that would otherwise be stored in the first transaction queue. The auxiliary transaction storage circuitry 204 is therefore provided to offload some of the responsibility of the first transaction queue 206 in a similar manner to the offloading of responsibility to the second storage structure described above. The second storage structure 208 will notify the auxiliary transaction storage circuitry 204 once the particular data item has been retrieved and the auxiliary transaction storage circuitry 204 triggers the first storage structure 202 to retrieve the particular data item.

Figure 16B:
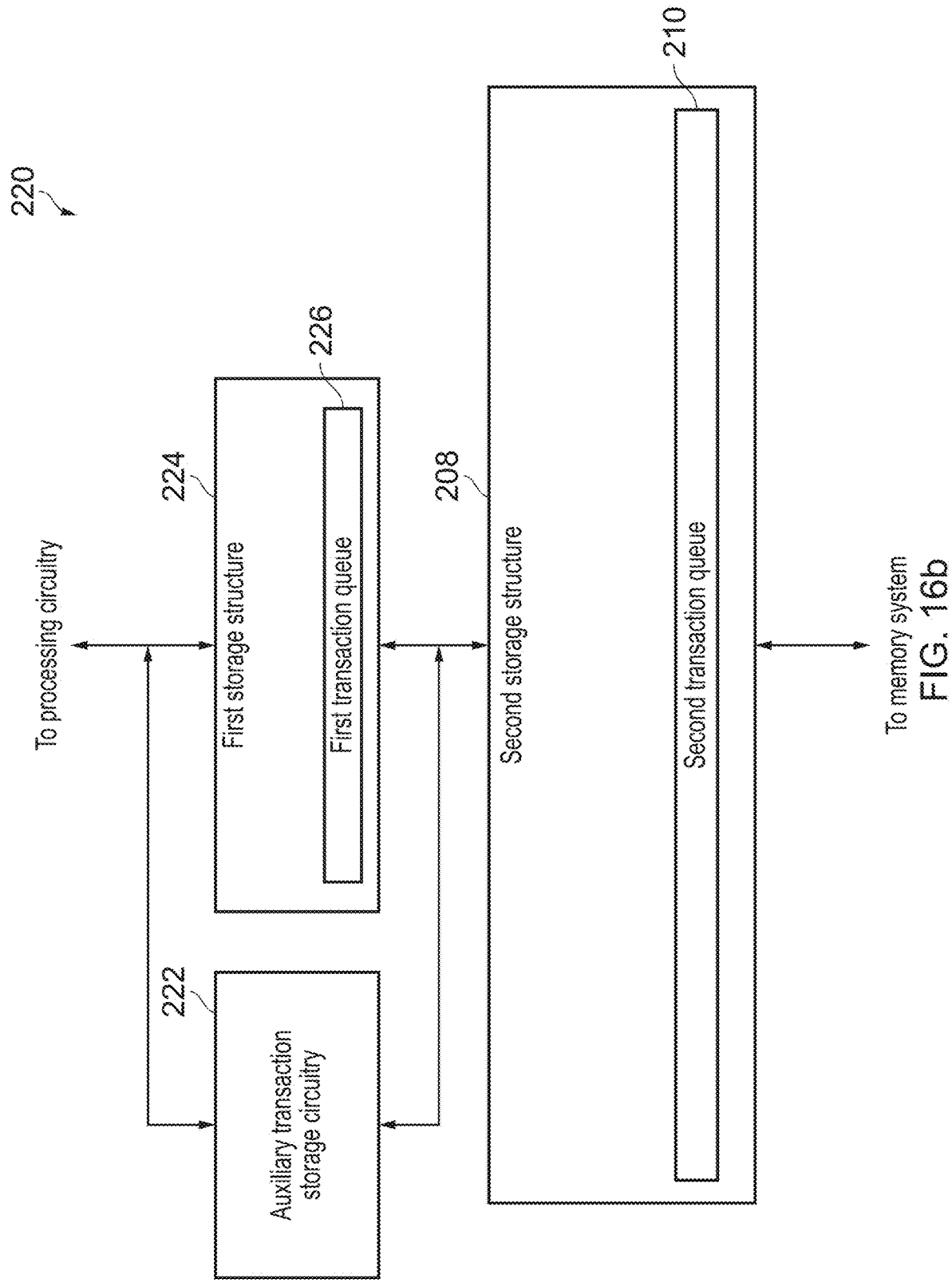
FIG. 16b schematically illustrates an apparatus according to some configurations of the present techniques.

FIG. 16b shows an alternative configuration of an apparatus 220 according to some configurations of the present technique. In the apparatus 220, the second storage structure 208 is arranged as in the apparatus 200 illustrated in FIG. 16a. However, the apparatus 220 is provided with a first storage structure 224 having a first transaction queue 226. However, in the illustrated configuration, the auxiliary transaction storage circuitry 22 is provided as a separate structure that is distinct from the first storage structure 224. The first storage structure 224 and the second storage structure 208 each interact with the auxiliary transaction storage 222 in the same manner as described in relation to FIG. 16a. However, because the auxiliary transaction storage structure 222 is provided separately to the first storage structure, the inclusion of this additional structure reduces the modifications necessary to the existing storage hierarchy.

Figure 17:
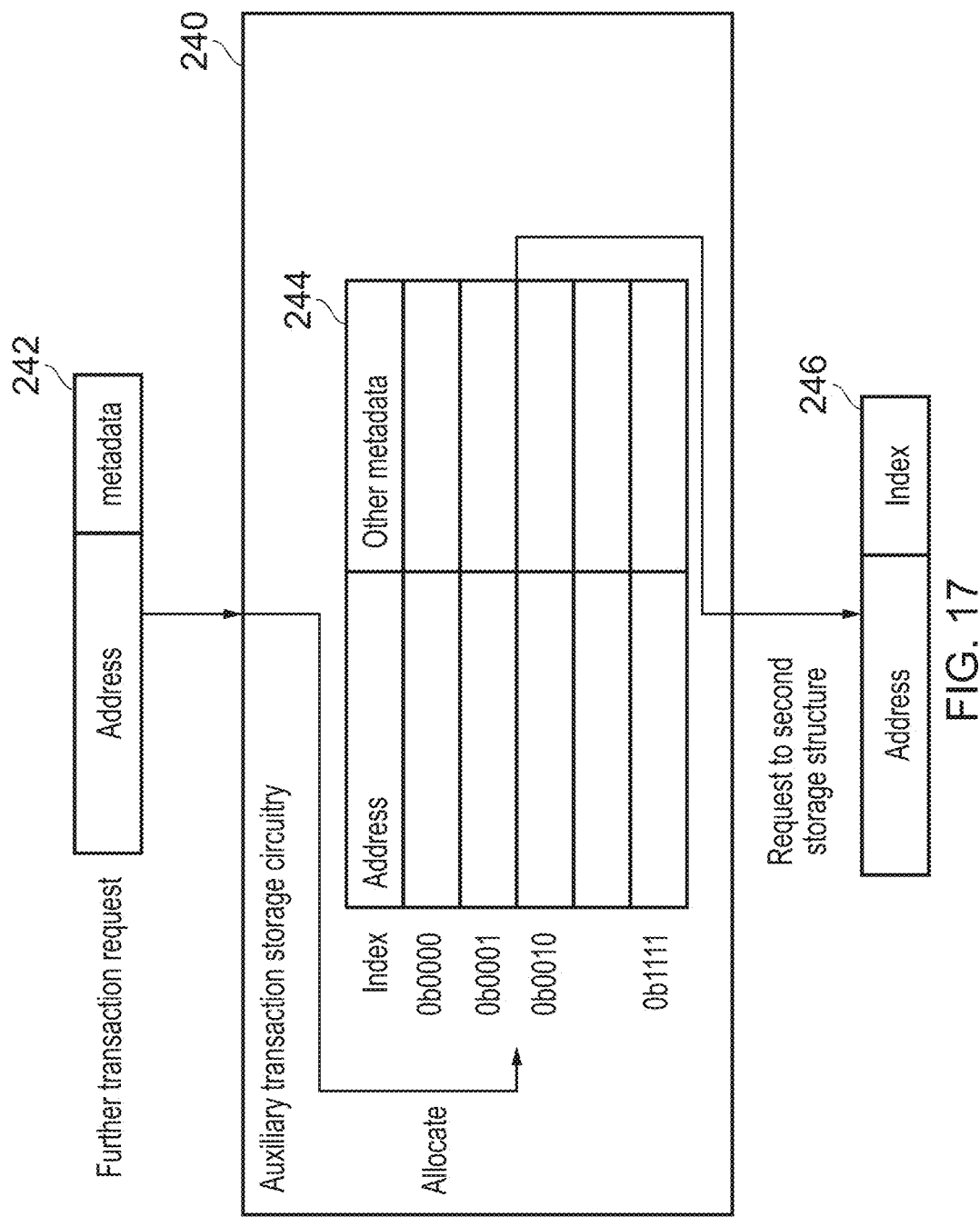
FIG. 17 schematically illustrates auxiliary transaction storage circuitry according to some configurations of the present techniques.

FIG. 17 schematically illustrates an example of auxiliary transaction storage circuitry 240 responding to receipt of a further transaction request 242 specifying an address from which data should be read (e.g., a virtual address or a physical address), and other metadata associated with the transaction. The further transaction request has been received by the first storage structure and it has been determined that the first storage structure does not currently hold data from that address. Hence, the first storage circuitry triggers the further transaction request 242 to be sent to the second storage structure. However, the rather than storing information identifying the further transaction request in the first transaction queue, the first storage circuitry delegates responsibility for tracking the further transaction request to the auxiliary transaction storage circuitry 240. The auxiliary transaction storage circuitry 240 receives the further transaction request and allocates data relating to the transaction in an auxiliary transaction queue 244. In particular, the auxiliary transaction storage circuitry 240 allocates the address and metadata of the further transaction request 242 along with (optionally) one or more further items of metadata to a location in the auxiliary transaction queue 244. The further transaction request 242 is allocated at a location having an index which is then included in the output further transaction request 246 passed to the second storage structure. The index is included in place of the metadata which is stored in the auxiliary transaction storage circuitry. The metadata may, for example, include information identifying the type of request and metadata associated with that type of request. The metadata may identify the further transaction request as a prefetch request requested by a particular prefetch engine. The output further transaction request 246 is then serviced by the second storage structure and is tracked by the auxiliary transaction storage circuitry 240.

Figure 18:
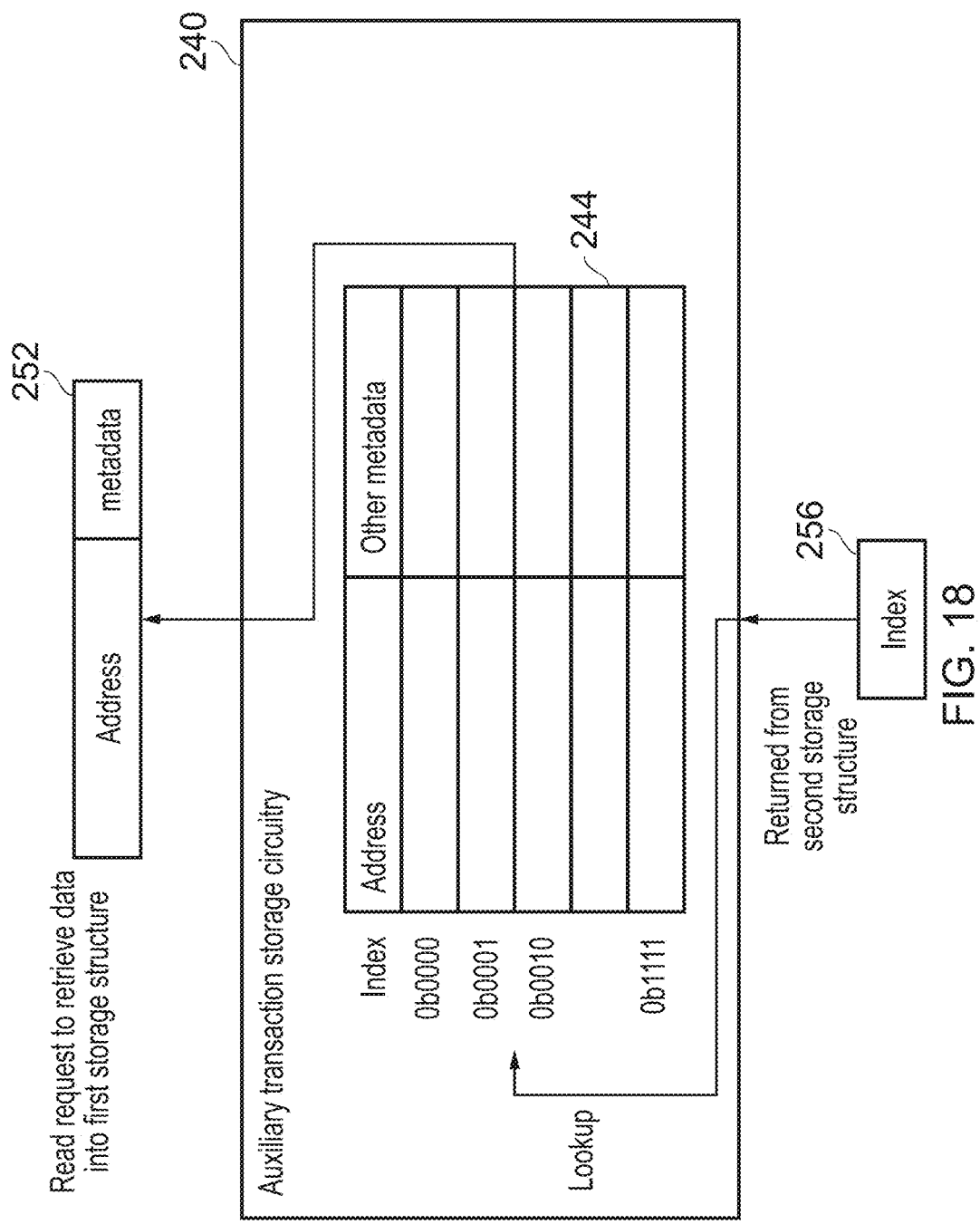
FIG. 18 schematically illustrates auxiliary transaction storage circuitry according to some configurations of the present techniques.

FIG. 18 schematically illustrates the response of the auxiliary transaction storage circuitry 240 in response to receipt of an index 256 returned from the second storage structure. The second storage structure is responsive to the output further transaction request 246 specifying an index to return the index 256 when the second storage structure identifies that the data at the request of the further transaction request 242 is available in the second storage structure. The auxiliary transaction storage circuitry 240 is responsive to receipt of the index 256 to perform a lookup in the auxiliary transaction queue 244 and, in response to a hit in the auxiliary transaction queue 244, the auxiliary transaction storage circuitry is configured to generate a read request 252 specifying the address and metadata that was stored in the auxiliary transaction queue. The read request 252 may be a prefetch request or a demand request. The read request 252 is then passed back to the first storage structure to trigger the first storage structure to request the data at the specified address. Advantageously, the data specified in the read request is already present in the second storage structure so any transaction data stored in the first transaction queue of the first storage structure will be there for a short duration, relative to a case in which the data at the specified address is not already in the second storage structure.

Figure 19:
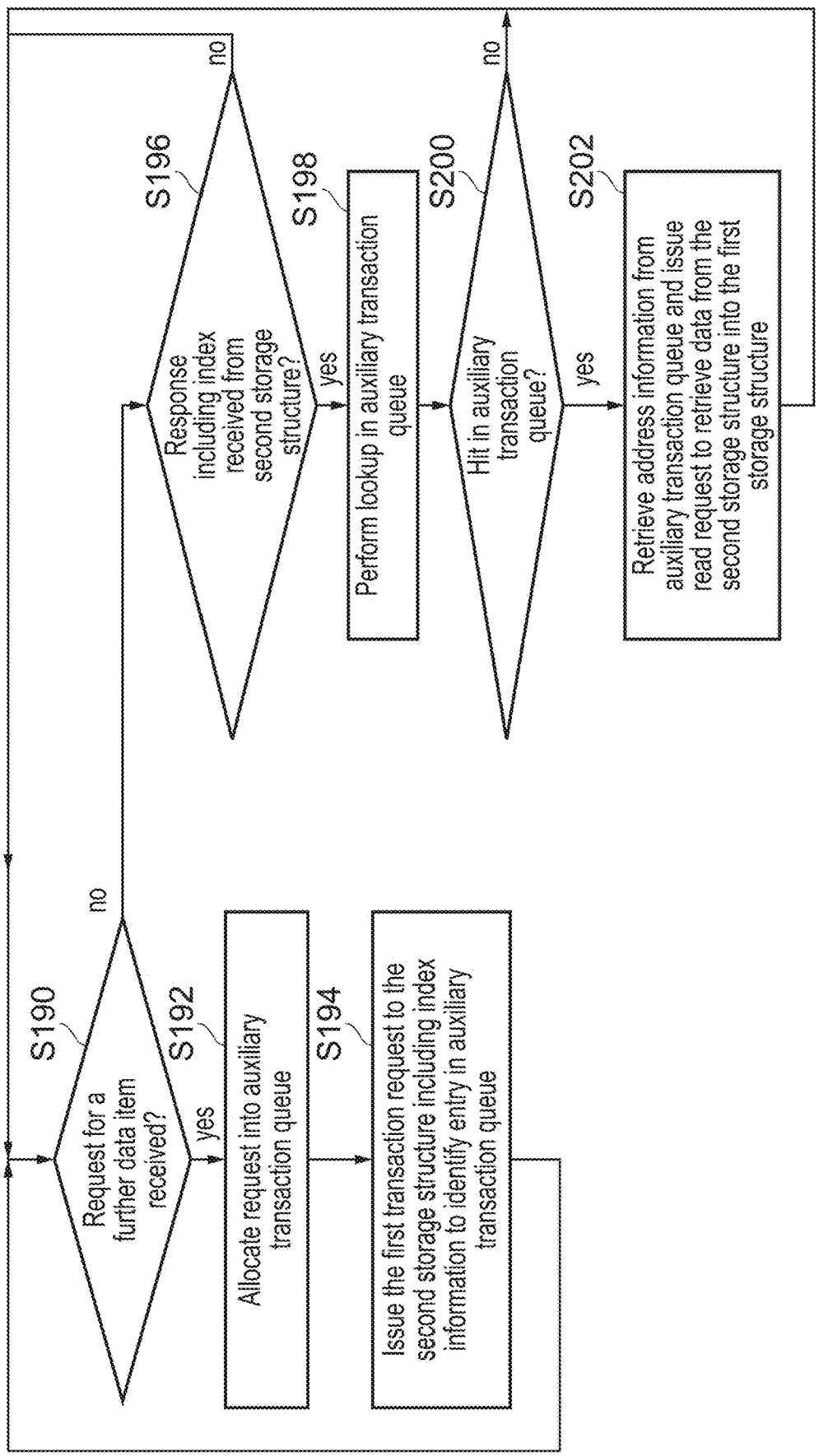
FIG. 19 schematically illustrates a sequence of steps according to some configurations of the present techniques.

FIG. 19 schematically illustrates a sequence of steps carried out according to some configurations of the present techniques. Flow begins at step S190 where it is determined if a request for a further data item is received. If, at step S190, it is determined that a request for a further data item has been received, then flow proceeds to step S192 where the request for the data item is allocated into the auxiliary transaction queue. Flow then proceeds to step S194 where a first transaction request is issued to the second storage structure including index information to identify the entry in the auxiliary transaction queue. Flow then returns to step S190.

If, at step S190, it is determined that no request for a further data item has been received, then flow proceeds to step S196 where it is determined if a response, including an index, has been received from the second storage structure. If, at step S196, a response has not been received, then flow returns to step S190. If, at step S196, it is determined that a response has been received, then flow proceeds to step S198. At step S198 a lookup is performed in the auxiliary transaction queue. Flow then proceeds to step S200 where it is determined if the lookup in the auxiliary transaction queue resulted in a hit. If, at step S200, it was determined that there was a hit in the auxiliary transaction queue, then flow proceeds to step S202 where the auxiliary storage structure retrieves information from the auxiliary transaction queue and issues a read request to the first storage structure to trigger retrieval of the data from the second storage structure into the first storage structure. Flow then returns to step S190. If, at step S200, it was determined that there was not a hit in the auxiliary transaction queue, then flow returns to step S190.

It will be readily apparent to the person of ordinary skill in the art that steps of the method set out in FIG. 19 may be performed in parallel. For example, steps S190, S192 and S194 may be provided as one process, and steps S196, S198, S200 and S202 may be provided as a separate parallel process. Furthermore, one or more corrective actions may be performed in response to a determination that, at step S200, the lookup in the auxiliary transaction queue has missed. For example, an exception may be triggered.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 20:
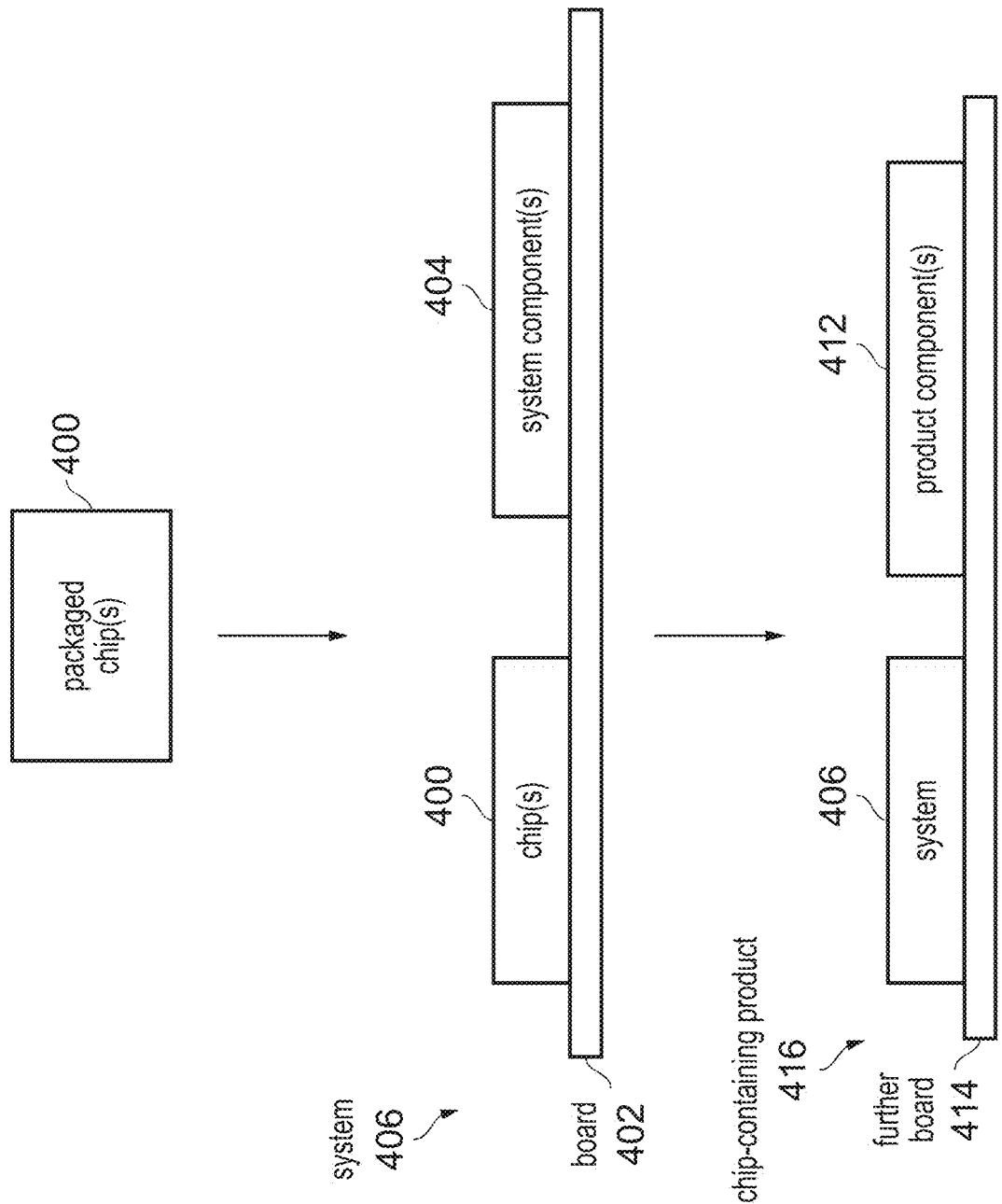
FIG. 20 schematically illustrates a system and a chip containing product according to some configurations of the present techniques.

As shown in FIG. 20, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts.

The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In brief overall summary there is provided an apparatus, a method, a system, a chip containing product, and a medium. The apparatus comprises a first storage structure to store a first set of data items, the first storage structure comprising a first transaction queue to store first transaction data to track fulfilment of outstanding first transaction requests. The apparatus is also provided with a second storage structure. The first storage structure is responsive to a received request for a given data item, to issue a first transaction request for the given data item to the second storage structure, and for a stage of fulfilment of the first transaction request, to omit storage of information relating to the first transaction request in the first transaction queue and to delegate the maintenance of at least some information relating to the stage of fulfilment of the first transaction request to the second storage structure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:
  a first storage structure configured to store a first set of data items, the first storage structure comprising a first transaction queue to store first transaction data to track fulfilment of outstanding first transaction requests for data items to be retrieved into the first storage structure; and
  a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items,
  wherein the first storage structure is responsive to a received request of a given request type for a given data item, to perform a lookup of the given data item in the first set of data items and, when the lookup misses in the first set of data items:
    to issue a first transaction request for the given data item to the second storage structure; and for at least one stage of fulfilment of the first transaction request, to omit storage of information relating to the first transaction request in the first transaction queue and to delegate the maintenance of at least some information relating to the at least one stage of fulfilment of the first transaction request to the second storage structure.

Clause 2. The apparatus of clause 1, wherein the first storage structure and the second storage structure are one of:
consecutive levels of storage within the storage hierarchy; and non-consecutive levels of storage within the storage hierarchy.

Clause 3. The apparatus of clause 1 or clause 2, wherein:
the received request is a first request; and
the first storage structure is responsive to a subsequent request for the given data item, the subsequent request received before fulfilment of the first request, to perform one or more actions to merge the first request and the subsequent request.

Clause 4. The apparatus of clause 3, wherein:
the given request type is a prefetch request and the first storage structure is responsive to receipt of a further request being of a demand type to retain the demand request in the first transaction queue during all stages of fulfilment of the demand request.

Clause 5. The apparatus of clause 4, wherein the first storage structure is responsive to the subsequent request being of the demand request type, to defer issuing a demand transaction for the given data item to the second storage structure until a signal acknowledging the first transaction request has been received from the second storage structure.

Clause 6. The apparatus of any of clause 3 to clause 5, wherein the first storage structure is responsive to a data available signal, indicating that the second set of data items comprises the given data item requested by the first request, to take one or more steps to fulfil one of the first request and the subsequent request and to omit one or more steps required to fulfil the other of the first request and the subsequent request.

Clause 7. The apparatus of clause 6, wherein the first storage structure is configured, when the subsequent request is received subsequent to the data available signal and as the one or more actions, to combine the first request and the subsequent request in the first transaction queue.

Clause 8. The apparatus of clause 6, wherein:
the first storage structure is configured, when the subsequent request is received prior to the data available signal, to issue a subsequent transaction request to the second storage structure for the given data item to trigger, as the one or more actions, the first transaction request and the subsequent transaction request to be combined in the second storage structure; and
for at least one stage of fulfilment of the subsequent transaction request, to omit storage of at least some information relating to the subsequent transaction request in the first transaction queue and to delegate the maintenance of at least some information relating to the at least one stage of fulfilment of the subsequent transaction request to the second storage structure.

Clause 9. The apparatus of any preceding clause, wherein the second storage structure is responsive to receipt of the first transaction request to allocate the first transaction request into the second transaction queue.

Clause 10. The apparatus of clause 9, wherein the second storage structure is responsive to receipt of the given data item to trigger a transfer of the given data item to the first storage structure.

Clause 11. The apparatus of clause 10, wherein:
triggering the transfer comprises issuing a data available signal indicating receipt of the given data item to the first storage structure; and
the first storage structure is responsive to the data available signal, to trigger allocation of the first transaction request into the first transaction queue and to take one or more actions to transfer the given data item to the first storage structure.

Clause 12. The apparatus of any preceding clause, wherein the first storage structure is configured, when the lookup misses in the first set of data items to defer allocation of the first transaction request for the given data item into the first transaction queue until receipt of an indication, from the second storage structure, that the given data item is available.

Clause 13. The apparatus of any preceding clause, wherein the first storage structure is configured, when the lookup misses in the first set of data items:
to perform an initial allocation of the first transaction request for the given data item into the first transaction queue; and
in response to an acknowledgement signal from the second storage structure, to deallocate the first transaction request from the first transaction queue.

Clause 14. The apparatus of clause 13, wherein the first storage structure is responsive to receipt of a data present signal, prior to receipt of the acknowledgement signal, indicating that the given data item is comprised in the second set of data items, to take one or more actions to transfer the given data item to the first storage structure without deallocating the first transaction request.

Clause 15. The apparatus of any preceding clause, wherein the first storage structure is responsive to a determination that the given data item is no longer required to issue a transaction abort signal to the second storage structure.

Clause 16. The apparatus of clause 15, wherein the second storage structure is responsive to the transaction abort signal, to deallocate the first transaction request from the second transaction queue.

Clause 17. The apparatus of any preceding clause, comprising auxiliary transaction storage circuitry comprising an auxiliary transaction queue to store auxiliary transaction data to track fulfilment of outstanding further transaction requests for data items to be retrieved to the first storage circuitry,
wherein the first storage structure is responsive to a further received request of a further request type for a further data item, to perform a lookup of the further data item in the first set of data items and, when the lookup misses in the first set of data items:
to issue a further transaction request for the further data item to the second storage structure; and
for at least one stage of fulfilment of the further transaction request, to omit storage of information relating to the first transaction request in the first transaction queue and to trigger an allocation procedure to allocate an entry in the auxiliary transaction queue and to encode index information indicative of the entry in the further transaction request.

Clause 18. The apparatus of clause 17, wherein the first storage circuitry is configured to store at least one data field in the first transaction data that is not present in the auxiliary transaction queue.

Clause 19. The apparatus of clause 17 or clause 18, wherein the first storage structure is responsive to receipt of a request complete indication comprising encoded index information, to trigger a lookup in the auxiliary transaction queue using the encoded index information to retrieve the entry indicative of the further received request, and to issue a read request for the further data item to be retrieved into the first storage structure based on the entry.

Clause 20. The apparatus of clause 19, wherein the second storage structure is configured to return the request complete indication when the second set of data items comprises the further data item.

Clause 21. The apparatus of any of clauses 17 to 20, wherein the second storage structure is responsive to receipt of the further data item to return the request complete indication, and to omit allocation of the further data item into second set of data items.

Clause 22. An apparatus comprising:
  a first storage structure configured to store a first set of data items, the first storage structure comprising a first transaction queue to store first transaction data to track fulfilment of outstanding first transaction requests for data items to be retrieved into the first storage structure;
  a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items; and
  auxiliary transaction storage circuitry comprising an auxiliary transaction queue to store auxiliary transaction data to track fulfilment of outstanding further transaction requests for data items to be retrieved to the first storage circuitry,
  wherein the first storage structure is responsive to a further received request of a further request type for a further data item, to perform a lookup of the further data item in the first set of data items and, when the lookup misses in the first set of data items:
  to issue a further transaction request for the further data item to the second storage structure; and
  for at least one stage of fulfilment of the further transaction request, to omit storage of information relating to the further transaction request in the first transaction queue and to trigger an allocation procedure to allocate an entry in the auxiliary transaction queue and to encode index information indicative of the entry in the further transaction request.

Clause 23. A system comprising:
  the apparatus of any preceding clause, implemented in at least one packaged chip;
  at least one system component; and
  a board,
  wherein the at least one packaged chip and the at least one system component are assembled on the board.

Clause 24. A chip-containing product comprising the system of clause 23, wherein the system is assembled on a further board with at least one other product component.

Clause 25. A method of operating an apparatus comprising a first storage structure configured to store a first set of data items, the first storage structure comprising a first transaction queue to store first transaction data to track fulfilment of outstanding first transaction requests for data items to be retrieved into the first storage structure, and a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items, the method comprising:
  in response to receipt, by the first storage structure, of a received request of a given request type for a given data item, performing a lookup of the given data item in the first set of data items and, when the lookup misses in the first set of data items:
  issuing a first transaction request for the given data item to the second storage structure; and
  for at least one stage of fulfilment of the first transaction request, omitting storage of information relating to the first transaction request in the first transaction queue and delegating the maintenance of at least some information relating to the at least one stage of fulfilment of the subsequent transaction request to the second storage structure.

Clause 26. A method of operating an apparatus comprising a first storage structure configured to store a first set of data items, the first storage structure comprising a first transaction queue to store first transaction data to track fulfilment of outstanding first transaction requests for data items to be retrieved into the first storage structure, and a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items, wherein the apparatus is provided with auxiliary transaction storage circuitry comprising an auxiliary transaction queue to store auxiliary transaction data to track fulfilment of outstanding further transaction requests for data items to be retrieved to the first storage circuitry
  the method comprising:
  in response to a further received request of a further request type for a further data item, performing a lookup of the further data item in the first set of data items and, when the lookup misses in the first set of data items:
  issuing a further transaction request for the further data item to the second storage structure; and for at least one stage of fulfilment of the further transaction request, omitting storage of information relating to the further transaction request in the first transaction queue and triggering an allocation procedure to allocate an entry in the auxiliary transaction queue and to encode index information indicative of the entry in the further transaction request.

Clause 27. A non-transitory computer-readable medium storing computer-readable code for fabrication of the apparatus of any of clauses 1 to 24.

We claim:

1. An apparatus comprising:
   a first storage structure configured to store a first set of data items, the first storage structure comprising a first transaction queue to store first transaction data to track fulfilment of outstanding first transaction requests for data items to be retrieved into the first storage structure; and
   a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items,
   wherein the first storage structure is responsive to a received request of a given request type for a given data item, to perform a lookup of the given data item in the first set of data items and, when the lookup misses in the first set of data items:
   to issue a first transaction request for the given data item to the second storage structure; and
   for at least one stage of fulfilment of the first transaction request, to omit storage of information relating to the first transaction request in the first transaction queue and to delegate the maintenance of at least some information relating to the at least one stage of fulfilment of the first transaction request to the second storage structure.

2. The apparatus of claim 1, wherein the first storage structure and the second storage structure are one of:
   consecutive levels of storage within the storage hierarchy; and
   non-consecutive levels of storage within the storage hierarchy.

3. The apparatus of claim 1, wherein:
   the received request is a first request; and
   the first storage structure is responsive to a subsequent request for the given data item, the subsequent request received before fulfilment of the first request, to perform one or more actions to merge the first request and the subsequent request.

4. The apparatus of claim 3, wherein:
   the given request type is a prefetch request and the first storage structure is responsive to receipt of a further request being of a demand type to retain the demand request in the first transaction queue during all stages of fulfilment of the demand request.

5. The apparatus of claim 4, wherein the first storage structure is responsive to the subsequent request being of the demand request type, to defer issuing a demand transaction for the given data item to the second storage structure until a signal acknowledging the first transaction request has been received from the second storage structure.

6. The apparatus of claim 3, wherein the first storage structure is responsive to a data available signal, indicating that the second set of data items comprises the given data item requested by the first request, to take one or more steps to fulfil one of the first request and the subsequent request and to omit one or more steps required to fulfil the other of the first request and the subsequent request.

7. The apparatus of claim 6, wherein the first storage structure is configured, when the subsequent request is received subsequent to the data available signal and as the one or more actions, to combine the first request and the subsequent request in the first transaction queue.

8. The apparatus of claim 6, wherein:
   the first storage structure is configured, when the subsequent request is received prior to the data available signal, to issue a subsequent transaction request to the second storage structure for the given data item to trigger, as the one or more actions, the first transaction request and the subsequent transaction request to be combined in the second storage structure; and
   for at least one stage of fulfilment of the subsequent transaction request, to omit storage of at least some information relating to the subsequent transaction request in the first transaction queue and to delegate the maintenance of at least some information relating to the at least one stage of fulfilment of the subsequent transaction request to the second storage structure.

9. The apparatus of claim 1, wherein the first storage structure is configured, when the lookup misses in the first set of data items to defer allocation of the first transaction request for the given data item into the first transaction queue until receipt of an indication, from the second storage structure, that the given data item is available.

10. The apparatus of claim 1, wherein the first storage structure is configured, when the lookup misses in the first set of data items:
    to perform an initial allocation of the first transaction request for the given data item into the first transaction queue; and
    in response to an acknowledgement signal from the second storage structure, to deallocate the first transaction request from the first transaction queue.

11. The apparatus of claim 10, wherein the first storage structure is responsive to receipt of a data present signal, prior to receipt of the acknowledgement signal, indicating that the given data item is comprised in the second set of data items, to take one or more actions to transfer the given data item to the first storage structure without deallocating the first transaction request.

12. The apparatus of claim 1, comprising auxiliary transaction storage circuitry comprising an auxiliary transaction queue to store auxiliary transaction data to track fulfilment of outstanding further transaction requests for data items to be retrieved to the first storage circuitry,
    wherein the first storage structure is responsive to a further received request of a further request type for a further data item, to perform a lookup of the further data item in the first set of data items and, when the lookup misses in the first set of data items:
    to issue a further transaction request for the further data item to the second storage structure; and
    for at least one stage of fulfilment of the further transaction request, to omit storage of information relating to the further transaction request in the first transaction queue and to trigger an allocation procedure to allocate an entry in the auxiliary transaction queue and to encode index information indicative of the entry in the further transaction request.

13. The apparatus of claim 12, wherein the first storage circuitry is configured to store at least one data field in the first transaction data that is not present in the auxiliary transaction queue.

14. The apparatus of claim 12, wherein the first storage structure is responsive to receipt of a request complete indication comprising encoded index information, to trigger a lookup in the auxiliary transaction queue using the encoded index information to retrieve the entry indicative of the further received request, and to issue a read request for the further data item to be retrieved into the first storage structure based on the entry.

15. The apparatus of claim 14, wherein the second storage structure is configured to return the request complete indication when the second set of data items comprises the further data item.

16. The apparatus of claim 12, wherein the second storage structure is responsive to receipt of the further data item to return the request complete indication, and to omit allocation of the further data item into second set of data items.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17, wherein the system is assembled on a further board with at least one other product component.

19. A method of operating an apparatus comprising:
a first storage structure configured to store a first set of data items, the first storage structure comprising a first transaction queue to store first transaction data to track fulfilment of outstanding first transaction requests for data items to be retrieved into the first storage structure, and a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items, the method comprising:

in response to receipt, by the first storage structure, of a received request of a given request type for a given data item, performing a lookup of the given data item in the first set of data items and, when the lookup misses in the first set of data items:
issuing a first transaction request for the given data item to the second storage structure; and
for at least one stage of fulfilment of the first transaction request, omitting storage of information relating to the first transaction request in the first transaction queue and delegating the maintenance of at least some information relating to the at least one stage of fulfilment of the subsequent transaction request to the second storage structure.

20. A non-transitory computer-readable medium storing computer-readable code for fabrication of an apparatus comprising:
a first storage structure configured to store a first set of data items, the first storage structure comprising a first transaction queue to store first transaction data to track fulfilment of outstanding first transaction requests for data items to be retrieved into the first storage structure; and
a second storage structure configured to store a second set of data items, the second storage structure comprising a second transaction queue to store second transaction data to track fulfilment of outstanding second transaction requests for data items to be retrieved into the second storage structure, wherein the first storage structure and the second storage structure are arranged in a storage hierarchy configured such that the first set of data items can be accessed by processing circuitry in fewer cycles than the second set of data items,
wherein the first storage structure is responsive to a received request of a given request type for a given data item, to perform a lookup of the given data item in the first set of data items and, when the lookup misses in the first set of data items:
to issue a first transaction request for the given data item to the second storage structure; and
for at least one stage of fulfilment of the first transaction request, to omit storage of information relating to the first transaction request in the first transaction queue and to delegate the maintenance of at least some information relating to the at least one stage of fulfilment of the subsequent transaction request to the second storage structure.

* * * * *